(12) United States Patent
Isono

(10) Patent No.: US 11,624,433 B2
(45) Date of Patent: Apr. 11, 2023

(54) DIFFERENTIAL ASSEMBLY

(71) Applicant: TOYOTA JIDOSHA KABUSHIKI KAISHA, Toyota (JP)

(72) Inventor: Hiroshi Isono, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/463,872

(22) Filed: Sep. 1, 2021

(65) Prior Publication Data

US 2022/0082163 A1 Mar. 17, 2022

(30) Foreign Application Priority Data

Sep. 17, 2020 (JP) .............................. JP2020-156004

(51) Int. Cl.
| | |
|---|---|
| *F16H 48/36* | (2012.01) |
| *F16H 48/10* | (2012.01) |
| *B62D 11/14* | (2006.01) |
| *B60K 17/35* | (2006.01) |
| *B60L 7/10* | (2006.01) |

(52) U.S. Cl.
CPC ............. *F16H 48/36* (2013.01); *B60K 17/35* (2013.01); *B62D 11/14* (2013.01); *F16H 48/10* (2013.01); *B60L 7/10* (2013.01); *F16H 2048/364* (2013.01)

(58) Field of Classification Search
CPC .... F16H 48/36; F16H 48/10; F16H 2048/364; F16H 48/38; F16H 57/0006; B60K 17/35; B60K 2001/001; B60K 17/08; B60K 17/16; B62D 11/14; B60L 7/10; B60L 2240/48; B60L 50/16; Y02T 10/7072
See application file for complete search history.

(56) References Cited

U.S. PATENT DOCUMENTS

| | | | | | |
|---|---|---|---|---|---|
| 1,717,784 | A | * | 6/1929 | Johnson | ................... F16H 48/10 |
| | | | | | 475/248 |
| 4,665,769 | A | * | 5/1987 | Parsons | ................... F16H 48/10 |
| | | | | | 475/174 |
| 2016/0153537 | A1 | | 6/2016 | Kubo et al. | |

FOREIGN PATENT DOCUMENTS

| | | | | |
|---|---|---|---|---|
| CA | 2443595 | A1 * | 4/2005 | ............. F16H 48/10 |
| EP | 2644429 | A1 * | 10/2013 | ............... B60K 1/00 |
| JP | 6122119 | B2 | 4/2017 | |
| WO | WO-2015173628 | A1 * | 11/2015 | ............. F16H 48/10 |

* cited by examiner

*Primary Examiner* — Justin Holmes
(74) *Attorney, Agent, or Firm* — Sughrue Mion, PLLC

(57) ABSTRACT

A downsized differential assembly having a simple structure, which can be mounted easily on automobiles. The differential assembly comprises a set of first to third gears arranged coaxially while being allowed to rotate relatively to one another. A first eccentric gear meshes with the first gear, a second eccentric gear meshes with the second gear, and a third eccentric gear meshes with the third gear, while being supported by an eccentric member in such a manner as to rotate around an eccentric axis which is offset from a rotational axis. Gear ratios between the first to third gears and the first to third eccentric gears are set to different values so that rotational speeds of the first gear and the second gear are reduced slower than that of the eccentric member.

8 Claims, 10 Drawing Sheets

DIFFERENTIAL ASSEMBLY

CROSS REFERENCE TO RELATED APPLICATION

The present disclosure claims the benefit of Japanese Patent Application No. 2020-156004 filed on Sep. 17, 2020, with the Japanese Patent Office, the disclosures of which are incorporated herein by reference in its entirety.

BACKGROUND

Field of the Disclosure

Embodiments of the present disclosure relate to the art of a differential assembly that allows two rotary shafts arranged coaxially to rotate in opposite directions.

Discussion of the Related Art

JP-B2-6122119 describes one example of a drive gear unit as a torque vectoring device mounted on a vehicle. The drive gear unit taught by JP-B2-6122119 comprises a differential gear unit that distributes rotational torque into right and left wheels, and a control (or differential) motor that controls a distribution ratio of torque distributed through the differential gear unit to the right and left wheels. According to the teachings of JP-B2-6122119, the drive gear unit comprises two sets of planetary gear units. In the drive gear unit, sun gears of the planetary gear units are connected to each other through a connection shaft to serve as an input element, each carrier of the planetary gear units individually serves as an output element, and each ring gear of the planetary gear units individually serves as a reaction element. An intermediate gear is fitted onto an intermediate portion of the connection shaft, and an input gear to which torque is delivered from a prime mover is mated with the intermediate gear. Each of the carriers is individually connected to the drive wheels through a driveshaft. The ring gears are connected to each other through a reversing mechanism including a first gear and a second gear, and the control motor is connected to one of the ring gears. Specifically, the first gear comprises a first pinion engaged with outer teeth of one of the ring gears, a shaft member, and a second pinion, and the first pinion and the second pinion are mounted on each end of the shaft member. Likewise, the second gear includes a first pinion engaged with outer teeth of the other one of the ring gears, a shaft member, and a second pinion, and the first pinion and the second pinion are mounted on each end of the shaft member. The second pinion of the first gear is engaged with the second pinion of the second gear. Thus, the reversing mechanism transmits torque delivered to one of the ring gears from the control motor to the other one of ring gears while reversing. In the drive gear unit taught by JP-B2-6122119, a distribution ratio of the torque delivered to the right wheel and the left drive wheel can be changed by controlling a torque of the control motor.

In the drive gear unit shown in FIG. 19 of JP-B2-6122119, the ring gears are connected to each other through a connection member to serve as the input element, the carriers serve the output element respectively, and the sun gears serve as the reaction element respectively. Specifically, the connection member includes the first pinion engaged with the outer teeth of one of the ring gears, the second pinion engaged with the outer teeth of the other one of the ring gears, and the shaft member, and the first pinion and the second pinion are mounted on each end of the shaft member. A drive gear to which torque is delivered from a prime mover is engaged with the outer teeth of the other one of the ring gears, and each of the carriers is individually connected to the wheels through the driveshaft. In the drive gear unit shown in FIG. 19 of JP-B2-6122119, the sun gears are connected to each other through a reversing motor including a motor and a gear unit. In the reversing motor, one end of a rotor shaft serves as a first output shaft, and a pinion is mounted on the other end of the rotor shaft. A first counter gear is mounted on one end of a counter shaft to be engaged with the pinion, and a second counter gear is mounted on the other end of the counter shaft to be engaged with inner teeth of a rotary member formed on a second output shaft extending coaxially with the first output shaft. The first output shaft is connected to one of the sun gears and the second output shaft is connected to the other one of the sun gears so that the torque delivered to one of the sun gears is delivered to the other one of the sun gears through the reversing motor while being reversed. That is, the reversing motor serves not only as the control motor but also as a reversing mechanism.

In order to fit the drive gear unit taught by JP-B2-6122119 into automobiles, it is preferable to downsize the drive gear unit as much as possible. However, in the drive gear unit shown in FIG. 1 of JP-B2-6122119, the reversing mechanism and the control motor are situated radially outer side of the ring gears thereby increasing the size of the drive gear unit in the radial direction. In the drive gear unit of this kind, for example, a torque of the control motor may be increased to downsize the control motor by arranging a speed reducing mechanism of large speed reducing ratio between the control motor and the ring gear. In this case, however, the size of the drive gear unit may be increased by the speed reducing mechanism.

On the other hand, in the drive gear unit shown in FIG. 19 of JP-B2-6122119, the reversing motor is disposed between the sun gears, and hence the drive gear unit may be downsized in the radial direction but it is not easy. That is, the reversing motor has a complicated dual-axis structure in which the counter shaft extends parallel to the first output shaft and the second output shaft. Therefore, if the additional speed reducing mechanism is arranged in the drive gear unit to downsize the reversing motor, the structure of the reversing motor becomes more complicated and this makes the reversing motor difficult to be fitted within an outer diameter of each of the planetary gear units.

SUMMARY

Aspects of embodiments of the present disclosure have been conceived noting the foregoing technical problems, and it is therefore an object of embodiments of the present disclosure to provide a downsized differential assembly having a simple structure, which can be mounted easily on automobiles.

An exemplary embodiment of the present disclosure relates to differential assembly, comprising: an input member to which a drive torque is delivered from a prime mover; a first rotary shaft and a second rotary shaft extending coaxially while being allowed to rotate relatively to each other; and a differential mechanism that distributes the drive torque delivered to the input member to the first rotary shaft and the second rotary shaft, and that allows the first rotary shaft and the second rotary shaft to rotate at different speeds. In order to achieve the above-explained objective, according to the exemplary embodiment of the present disclosure, the differential mechanism is provided with: a first gear that is arranged around a common rotational axis of the first rotary shaft and the second rotary shaft to be rotated integrally with the first rotary shaft; a second gear that is arranged around the common rotational axis to be rotated integrally with the second rotary shaft and to be rotated relatively to the first gear; a third gear to which the drive torque is delivered from the input member, and that is arranged around the common rotational axis while being allowed to rotate relatively to the first gear and the second gear; a first eccentric gear that is arranged around an eccentric axis offset from the common rotational axis to be meshed with the first gear; a second eccentric gear that is arranged around the eccentric axis to be meshed with the second gear and to be rotated integrally with the first eccentric gear; a third eccentric gear that is arranged around the eccentric axis to be meshed with the third gear and to be rotated integrally with the first eccentric gear and the second eccentric gear; and an eccentric member that is arranged around the common rotational axis to support the first eccentric gear, the second eccentric gear, and the third eccentric gear, such that the first eccentric gear, the second eccentric gear, and the third eccentric gear rotate around the eccentric axis and revolve around the common rotational axis. In the differential mechanism, internal gears are employed as: one of a set of the first gear, the second gear, and the third gear; and a set of the first eccentric gear, the second eccentric gear, and the third eccentric gear. Whereas, external gears are employed as: the other one of the set of the first gear, the second gear, and the third gear; and the set of the first eccentric gear, the second eccentric gear, and the third eccentric gear. Those external gears engage with the internal gears from radially inner side, respectively. A gear ratio between the first gear and the first eccentric gear, a gear ratio between the second gear and the second eccentric gear, and a gear ratio between the third gear and the third eccentric gear are set to different values. In addition, a rotational speed of the first gear and a rotational speed of the second gear are reduced slower than a rotational speed of the eccentric member.

In a non-limiting embodiment, the differential assembly may further comprise a control motor that generates a control torque to be applied to the third gear. The differential mechanism may allow the first gear and the second gear to rotate in opposite directions when the control torque is applied to the third gear from the control motor. A distribution ratio of the drive torque delivered from the input member to the first rotary shaft and the second rotary shaft may be controlled by changing the control torque generated by the control motor.

In a non-limiting embodiment, the differential assembly may further comprise: a speed increasing planetary gear set comprising a speed increasing sun gear, a speed increasing ring gear, and a speed increasing carrier; and a speed reducing planetary gear set comprising a reduction sun gear, a reduction ring gear, and a reduction carrier. The speed increasing planetary gear set and the speed reducing planetary gear set may be formed around the common rotational axis. The speed increasing sun gear may be fixed and not allowed to rotate, the speed increasing carrier may be rotated integrally with the first gear, and the speed increasing ring gear may be rotated at a higher speed than a rotational speed of the speed increasing carrier. The reduction ring gear may be connected to the speed increasing ring gear to be rotated integrally with the speed increasing ring gear, and the reduction carrier may be rotated integrally with the eccentric member at a lower speed than a rotational speed of the reduction ring gear. The reduction sun gear may be rotated integrally with an output shaft of the control motor, and relatively to the first gear and the eccentric member, when the first rotary shaft and the second rotary shaft are rotated passively at a same speed in a same direction together with the eccentric member.

In a non-limiting embodiment, the differential assembly may be mounted on a vehicle having a right wheel and a left wheel together with the prime mover and the control motor. In this case, the first rotary shaft may transmit a torque between one of the wheels and the first gear, and the second rotary shaft may transmit a torque between the other one of the wheels and the second gear. In the vehicle of this kind, the first rotary shaft and the second rotary shaft may extend coaxially in a width direction of the vehicle.

In a non-limiting embodiment, the differential assembly may also be mounted on a vehicle having a front wheel and a rear wheel together with the prime mover and the control motor. In this case, the first rotary shaft transmits a torque between one of the wheels and the first gear, and the second rotary shaft transmits a torque between the other one of the wheels and the second gear. In the vehicle of this kind, the first rotary shaft and the second rotary shaft may extend coaxially in a longitudinal direction of the vehicle.

In a non-limiting embodiment, the first gear may include a first sun gear as the external gear, the second gear may include a second sun gear as the external gear, and the third gear may include a third sun gear as the external gear. On the other hand, the first eccentric gear may include a first eccentric ring gear as the internal gear, the second eccentric gear may include a second eccentric ring gear as the internal gear, and the third eccentric gear may include a third eccentric ring gear as the internal gear. Further, the eccentric member may include an eccentric carrier that supports the first eccentric ring gear, the second eccentric ring gear, and the third eccentric ring gear in a rotatable manner from radially outer side. In this case, the eccentric carrier may allow the first eccentric ring gear, the second eccentric ring gear, and the third eccentric ring gear to rotate around the eccentric axis and revolve around the common rotational axis, when the eccentric carrier rotates.

In a non-limiting embodiment, the eccentric carrier may be formed into a cylindrical shape around the common rotational axis. In addition, the eccentric carrier may comprise a counterbalance weight that is formed on an outer circumferential surface of the eccentric carrier to correct an unbalance of rotation of the eccentric carrier.

In a non-limiting embodiment, the first gear may include a first ring gear as the internal gear, the second gear may include a second ring gear as the internal gear, and the third gear may include a third ring gear as the internal gear. On the other hand, the first eccentric gear may include a first eccentric ring gear as the external gear, the second eccentric gear may include a second eccentric ring gear as the external gear, and the third eccentric gear may include a third eccentric ring gear as the external gear. Further, the eccentric member may include an eccentric cam that supports the first eccentric ring gear, the second eccentric ring gear, and the third eccentric ring gear in a rotatable manner from radially inner side. In this case, the eccentric cam may allow the first eccentric ring gear, the second eccentric ring gear, and the third eccentric ring gear to rotate around the eccentric axis and revolve around the common rotational axis, when the eccentric cam rotates.

In a non-limiting embodiment, the eccentric cam may be formed into a cylindrical shape around the eccentric axis. In addition, the eccentric cam may comprise a counterbalance weight that is formed on an inner circumferential surface of the eccentric cam to correct an unbalance of rotation of the eccentric cam.

Thus, according to the exemplary embodiment of the present disclosure, the differential assembly comprises only six gears including the first to third gears and first to third eccentric gears, and the first to third eccentric gears are supported by the eccentric member in a rotatable and revolvable manner while being meshed with the first to third gears, respectively. As described, internal gears are employed as one of the sets of the first to third gears and the first to third eccentric gears, and external gears are employed as the other one of the sets of the first to third gears and the first to third eccentric gears. That is, the differential mechanism of the differential assembly is a complex planetary gear set comprising three sets of internal contact type planetary gear sets commonly using the eccentric member. Such internal contact type planetary gear set does not have a planetary pinion, therefore, a structure of the internal contact type planetary gear set is simpler than that of a conventional planetary gear set in which a planetary pinion is interposed between a sun gear and a ring gear.

In the differential assembly thus structured, the first gear ratio between the first gear and the first eccentric gear, the second gear ratio between the second gear and the second eccentric gear, and the third gear ratio between the third gear and the third eccentric gear are set to different values. Therefore, when the first rotary shaft connected to the first gear and the second rotary shaft connected to the second gear are rotated at a same speed, torques are applied to an engagement site between the first gear and the first eccentric gear, and to an engagement site between the second gear and the second eccentric gear in opposite directions thereby causing interference between those engagement sites. Consequently, the differential mechanism is substantially brought into engagement to rotate integrally so that the first rotary shaft and the second rotary shaft are rotated integrally without rotating relatively to each other. By contrast, when the first rotary shaft and the second rotary shaft are rotated at different speeds, the differential mechanism will not be brought into engagement due to interference between the above-mentioned engagement sites. In this case, the differential mechanism transmits the torque in accordance with the first gear ratio and the second gear ratio. Consequently, a rotational direction of one of the first rotary shaft and the second rotary shaft is reversed to a direction opposite to a rotational direction of the other one of the first rotary shaft and the second rotary shaft. Thus, the differential assembly according to the exemplary embodiment of the present disclosure not only distributes the torque of the prime mover to the first rotary shaft and the second rotary saft, but also absorbs the speed difference between the first rotary shaft and the second rotary shaft. For this reason, the differential assembly may serve as a compact differential unit having a simple structure.

The differential assembly according to the exemplary embodiment of the present disclosure may be combined with the control motor to serve as a torque vectoring device. In the differential assembly, the control torque of the control motor is distributed from the eccentric member to the first rotary shaft through the first gear and to the second rotary shat through the second sun gear while being multiplied. Consequently, the first gear and the second gear are rotated in opposite directions. That is, a distribution ratio of the drive torque to the first rotary shaft connected to one of drive wheels and the second rotary shaft connected to the other one of drive wheels can be controlled by changing the control torque generated by the control motor. As described, the differential mechanism is a complex planetary gear set comprising three sets of internal contact type planetary gear sets so that the control torque of the control motor may be distributed to the first gear and the second gear while being multiplied by relatively large factors. According to the exemplary embodiment of the present disclosure, therefore, the control motor may be downsized, and the differential assembly may serve as a compact differential unit having a simple structure.

In order not to rotate the control motor passively, the differential assembly according to the exemplary embodiment of the present disclosure is provided with the speed increasing planetary gear set and the speed reducing planetary gear set. In the differential assembly according to the exemplary embodiment of the present disclosure, the first gear, the second gear, the third gear, and the eccentric member are rotated integrally when the first rotary shaft and the second rotary shaft the rotate in the same direction at a same speed. Consequently, the speed increasing carrier of the speed increasing planetary gear set and the reduction carrier of the speed reducing planetary gear set are rotated in the same direction at a same speed. In this situation, the speed increasing planetary gear set in which the speed increasing sun gear is fixed serves as a speed increasing mechanism to increase a rotational speed of the speed increasing ring gear higher than a rotational speed of the speed increasing carrier. On the other hand, the speed reducing planetary gear set serves as a speed reducing mechanism to reduce a rotational speed of the reduction carrier lower than a rotational speed of the reduction ring gear. In this situation, since the speed increasing ring gear is connected to the reduction ring gear, the speed increasing ring gear and the reduction ring gear are also rotated at a same speed. Consequently, an absolute value of the speed increasing ratio of the speed increasing planetary gear set and an absolute value of the speed reducing ratio of the speed reducing planetary gear set are equalized to each other. In this situation, since a rotational speed of the speed increasing sun gear is zero, the rotational speed of the reduction sun gear is reduced to substantially zero that is lower than the rotational speed of the reduction ring gear or the reduction carrier, in accordance with the gear ratio of the speed reducing planetary gear set. That is, since the gear ratio of the speed increasing planetary gear set and the gear ratio of the speed reducing planetary gear set are equal to each other, the rotational speed of the reduction sun gear is reduced to substantially zero. Therefore, when the first rotary shaft and the second rotary shaft rotate in the same direction at the same speed so that the first gear, the second gear, the third gear, and the eccentric member are rotated integrally and passively, a rotational speed of the output shaft of the control motor connected to the reduction sun gear is maintained to zero. For this reason, the control motor can be prevented from being rotated passively. By thus preventing the passive rotation of the control motor, a power transmission efficiency of the differential assembly and an energy efficiency of the vehicle can be improved.

For example, in the vehicle, the first rotary shaft may be connected to one of the right and left wheels, and the second rotary shaft may be connected to the other one of the right and left wheels. According to the exemplary embodiment of the present disclosure, therefore, the complex planetary gear unit may serve as a differential mechanism of the vehicle. In addition, since the differential assembly according to the exemplary embodiment of the present disclosure is provided with the control motor, the differential assembly may also serve as a torque vectoring device that is easily fitted into the vehicle.

Instead, the differential assembly according to the exemplary embodiment of the present disclosure may also be mounted on a four-wheel drive layout vehicle. In this case, the first rotary shaft may also be connected to one of the front and rear wheels, and the second rotary shaft may be connected to the other one of the front and rear wheels to serve as a center differential mechanism.

In a case that the external gears are employed as the first to third gears, the internal gears are employed as the first to third eccentric gears. In this case, a unit of the first to third eccentric gears is held in the eccentric carrier while being allowed to rotate around the eccentric axis which is offset from the common rotational axis of the first rotary shaft and the second rotary shaft. In the eccentric carrier, the third eccentric ring gear is rotated by a rotation of the third sun gear that is rotated by the drive torque or a rotation of the eccentric carrier that is rotated by the control torque. Consequently, the unit of the eccentric ring gears rotates around the eccentric axis while revolving around the common rotational axis. That is, the differential mechanism of the differential assembly is a complex planetary gear set comprising three sets of internal contact type planetary gear sets commonly using the eccentric carrier. As described, the differential assembly according to the exemplary embodiment of the present disclosure may as a compact differential mechanism having a torque vectoring device.

Specifically, the eccentric carrier is a cylindrical member having a counterbalance weight that is formed on an outer circumferential surface of the eccentric carrier. According to one aspect of the present disclosure, the set of internal gears revolves eccentrically about the set of external gears. Consequently, the eccentric carrier rotates out-of-balance due to imbalance of weight of the unit of the internal gears revolving around the rotational center axis. According to the exemplary embodiment of the present disclosure, such unbalance of rotation of the eccentric carrier is corrected by the counterbalance weight formed on the eccentric carrier. To this end, for example, the counterbalance weight is formed on the eccentric carrier at a site out of phase with a heaviest portion of the unit of the internal gears by 180 degrees. According to one aspect of the present disclosure, gear teeth are not formed on outer circumferential surfaces of the eccentric ring gears. Therefore, an outer diameter of the unit of the eccentric ring gears may be reduced so that a space for the counterbalance weight may be ensured on the outer circumferential surface of the eccentric carrier. Thus, rotations of the rotary members in the differential assembly may be stabilized by the counterbalance weight.

In a case that the internal gears are employed as the first to third gears, the external gears are employed as the first to third eccentric gears. In this case, a unit of the first to third eccentric gears is supported by the eccentric cam from radially inner side while being allowed to rotate around the eccentric axis which is offset from the common rotational axis of the first rotary shaft and the second rotary shaft. Around the eccentric cam, the third eccentric ring gear is rotated by a rotation of the third sun gear that is rotated by the drive torque or a rotation of the eccentric cam that is rotated by the control torque. Consequently, the unit of the eccentric ring gears rotates around the eccentric axis while revolving around the common rotational axis. That is, the differential mechanism of the differential assembly is a complex planetary gear set comprising three sets of internal contact type planetary gear sets commonly using the eccentric carrier. As described, the differential assembly according to the exemplary embodiment of the present disclosure may as a compact differential mechanism having a torque vectoring device.

Specifically, the eccentric cam is a cylindrical member having a counterbalance weight that is formed on an inner circumferential surface of the eccentric cam. According to another aspect of the present disclosure, the set of external gears revolves eccentrically about the set of internal gears. Consequently, the eccentric cam rotates out-of-balance due to imbalance of weight of the unit of the external gears revolving around the rotational center axis. According to the exemplary embodiment of the present disclosure, such unbalance of rotation of the eccentric cam is corrected by the counterbalance weight formed on the eccentric cam. To this end, for example, the counterbalance weight is formed on the eccentric cam at a site 180 degrees out of phase with a radially outermost portion of the unit of the external gears on an orbit of the unit of the external gears. According to another aspect of the present disclosure, gear teeth are not formed on inner circumferential surfaces of the eccentric ring gears. Therefore, an outer diameter of the unit of the eccentric ring gears may be reduced so that a space for the counterbalance weight may be ensured on the inner circumferential surface of the eccentric cam. Thus, rotations of the rotary members in the differential assembly may be stabilized by the counterbalance weight.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
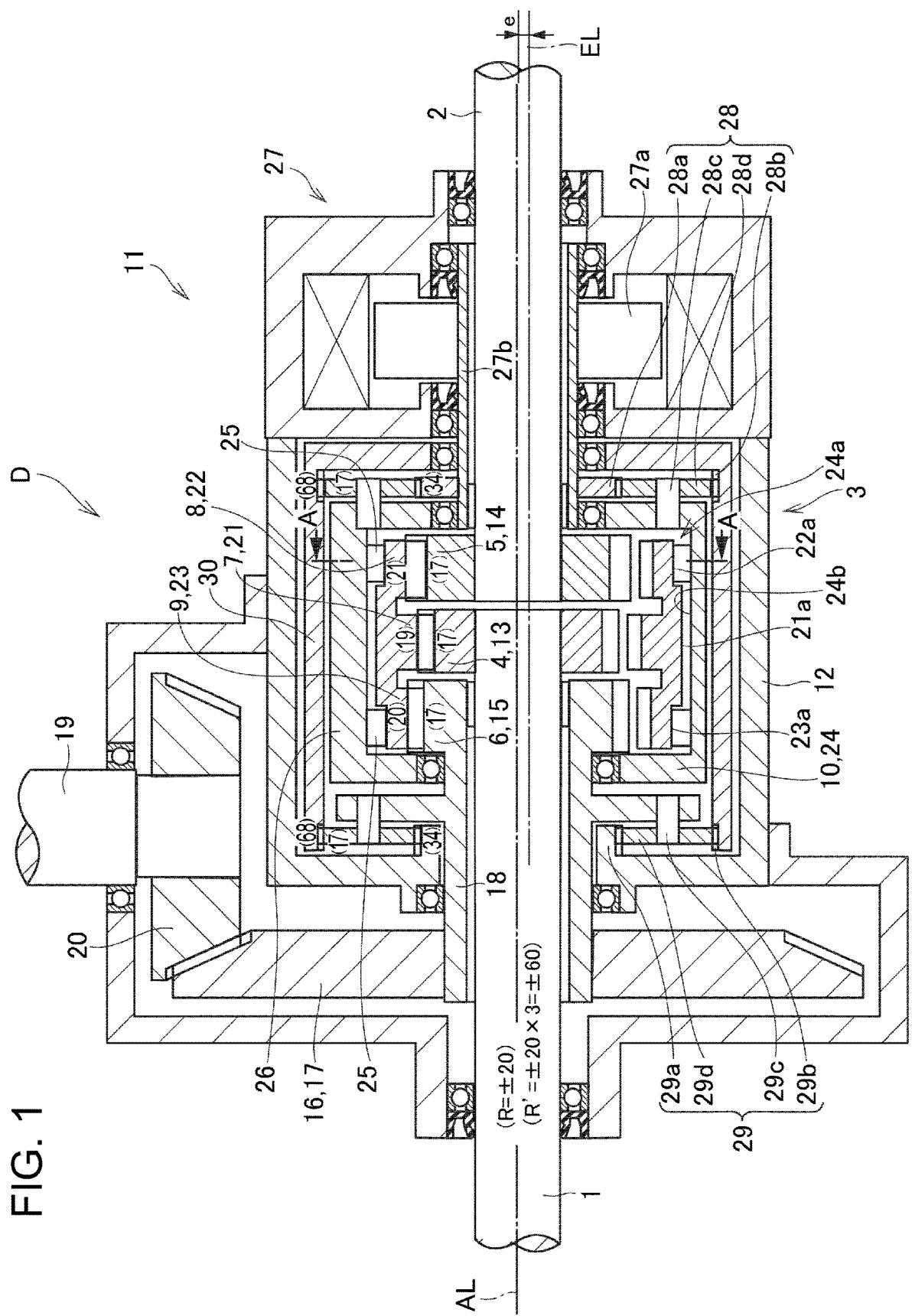
FIG. 1 is a cross-sectional view showing a structure of the differential assembly according a first example of the present disclosure.

Referring now to FIG. 1, there is shown a structure of a differential assembly D as a transmission mechanism according to a first example of the present disclosure. The differential assembly D comprises a first rotary shaft 1, a second rotary shaft 2, and a differential mechanism 3. The differential mechanism 3 includes a first gear 4, a second gear 5, a third gear 6, a first eccentric gear 7, a second eccentric gear 8, a third eccentric gear 9, and an eccentric member 10. The differential assembly D shown in FIG. 1 is designed to be mounted on vehicles to serve as a differential unit 11 that allows a differential rotation between a left wheel and a right wheel (neither of which are shown).

The first rotary shaft 1 and the second rotary shaft 2 are arranged coaxially with each other along a rotational center axis AL. The first rotary shaft 1 and the second rotary shaft 2 are supported by a case 12 of the differential assembly D through bearings (not shown) so that the first rotary shaft 1 and the second rotary shaft 2 are allowed to rotate relatively to each other. According to the first example shown in FIG. 1, specifically, a leading end of the first rotary shaft 1 serving as a driveshaft protrudes from the case 12 to be connected to any one of the right and left wheels, and a leading end of the second rotary shaft 2 also serving as a driveshaft protrudes from the case 12 to be connected to the other one of the right and left wheels.

The first gear 4, the second gear 5, and the third gear 6 are arranged in order along the rotational center axis AL while being allowed to rotate relatively to one another. The first gear 4 is engaged with the first eccentric gear 7, the second gear 5 is engaged with the second eccentric gear 8, and the third gear 6 is engaged with the third eccentric gear 9, respectively. Specifically, the first eccentric gear 7, the second eccentric gear 8, and the third eccentric gear 9 individually rotate eccentrically about the rotational center axis AL.

In the differential assembly D shown in FIG. 1, a first eccentric ring gear 21 as an internal gear serves as the first eccentric gear 7, a second eccentric ring gear 22 as an internal gear serves as the second eccentric gear 8, and a third eccentric ring gear 23 as an internal gear serves as the third eccentric gear 9. On the other hand, a first sun gear 13 as an external gear serves as the first gear 4, a second sun gear 14 as an external gear serves as the second gear 5, and a third sun gear 15 as an external gear serves as the third gear 6.

The first sun gear 13 is mounted on the first rotary shaft 1 to be rotated integrally with the first rotary shaft 1, and the second sun gear 14 is mounted on the second rotary shaft 2 to be rotated integrally with the second rotary shaft 2.

The third sun gear 15 is connected to an input member 16 to which a drive torque is applied from a prime mover (not shown). The prime mover includes not only an engine and a drive motor but also a brake device. That is, not only a drive torque to propel the vehicle (not shown) but also a brake torque to decelerate the vehicle is applied to the input member 16.

In the differential assembly D shown in FIG. 1, a differential ring gear 17 serves as the input member 16. The differential ring gear 17 is fitted onto a rotary shaft 18 of the third sun gear 15 so that the differential ring gear 17, the rotary shaft 18, and the third sun gear 15 are rotated integrally. Specifically, the differential ring gear 17 as a diametrically larger bevel gear is meshed with a drive pinion 20 as a diametrically smaller bevel gear that is fitted onto a leading end of a propeller shaft 19 of the vehicle. The number of teeth of the drive pinion 20 is less than the number of teeth of the differential ring gear 17. That is, the drive pinion 20 and the differential ring gear 17 serve as a final reduction gear unit of the vehicle. The other end of the propeller shaft 19 (not shown) is joined to the prime mover of the vehicle. Thus, the differential unit 11 is connected to the prime mover of the vehicle though the differential ring gear 17 and the propeller shaft 19.

The third eccentric gear 9, the first eccentric gear 7, and the second eccentric gear 8 are formed in order, in such a manner as to rotate integrally around an eccentric axis EL which extends parallel to the rotational center axis AL.

As described, the first eccentric ring gear 21 serving as the first eccentric gear 7 meshes with the first sun gear 13 serving as the first gear 4, the second eccentric ring gear 22 serving as the second eccentric gear 8 meshes with the second sun gear 14 serving as the second gear 5, and the third eccentric ring gear 23 serving as the third eccentric gear 9 meshes with the third sun gear 15 serving as the third gear 6.

That is, the first eccentric ring gear 21 rotates around the eccentric axis EL and revolves around the first sun gear 13 rotating around the rotational center axis AL, the second eccentric ring gear 22 rotates around the eccentric axis EL and revolves around the second sun gear 14 rotating around the rotational center axis AL, and the third eccentric ring gear 23 rotates around the eccentric axis EL and revolves around the third sun gear 15 rotating around the rotational center axis AL. Thus, the third eccentric gear 9, the first eccentric gear 7, and the second eccentric gear 8 revolves and rotates integrally.

The eccentric member 10 is also arranged around the rotational center axis AL, and the first eccentric gear 7, the second eccentric gear 8, and the third eccentric gear 9 are supported by the eccentric member 10 while being allowed to revolve around the rotational center axis AL and to rotate around the eccentric axis EL. In the differential assembly D shown in FIG. 1, an eccentric carrier 24 is adopted as the eccentric member 10 to support the first eccentric ring gear 21, the second eccentric ring gear 22, and the third eccentric ring gear 23 from radially outer side.

Figure 2:
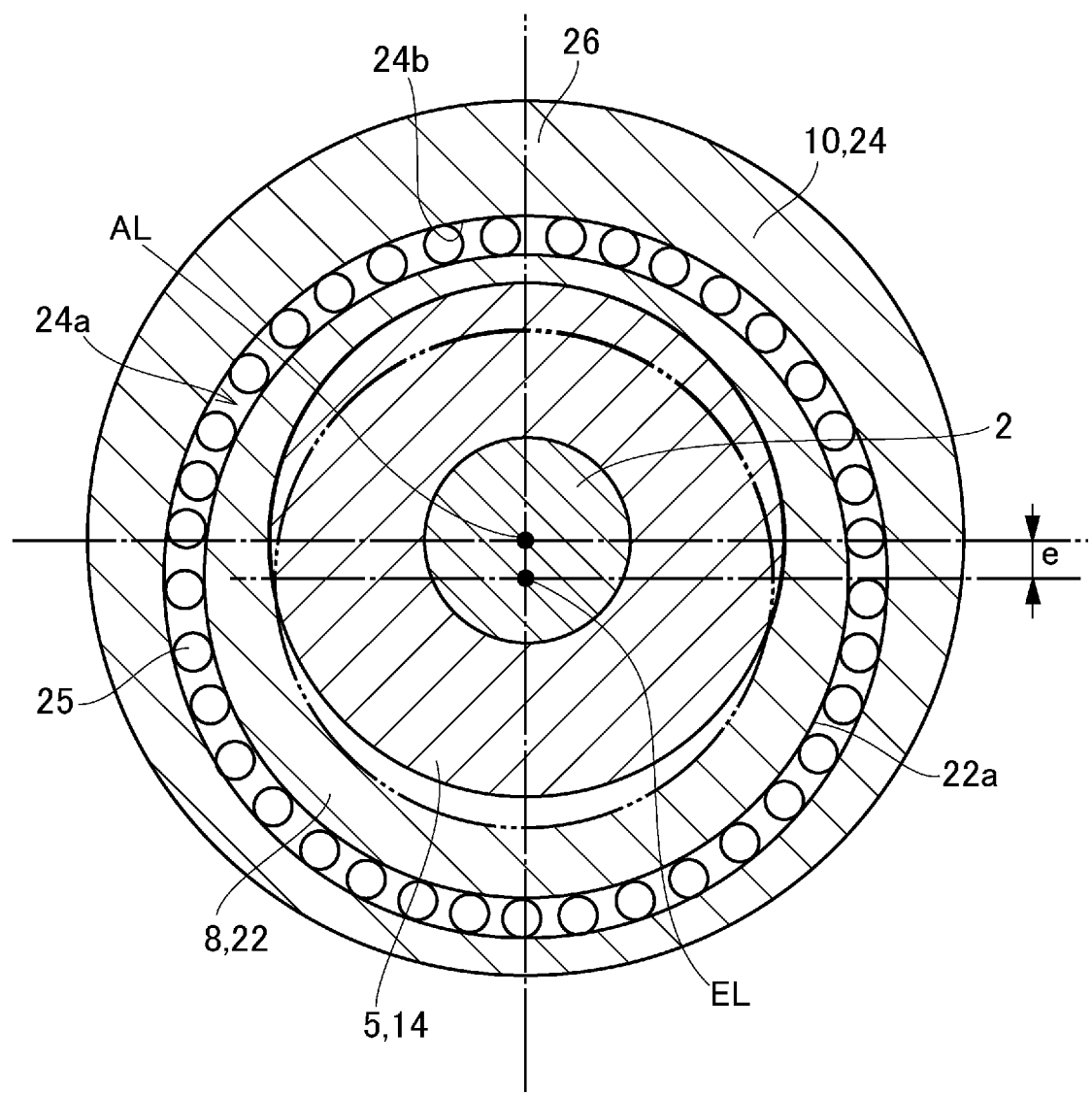
FIG. 2 is a cross-sectional view showing a cross-section of the differential mechanism along A-A line in FIG. 1.

Specifically, the eccentric carrier 24 is a disc-shaped or cylindrical rotary member, and is arranged concentrically around the first rotary shaft 1 and the second rotary shaft 2. The eccentric carrier 24 is supported by bearings (not shown) in such a manner as to rotate relatively to the first rotary shaft 1 and the second rotary shaft 2, and also supported by the case 12 through another bearing (not shown) in a rotatable manner. As illustrated in FIGS. 1 and 2, the eccentric axis EL extends parallel to the rotational center axis AL of the eccentric carrier 24 and is offset from the rotational center axis AL. In the example shown in FIG. 2, the eccentric axis EL is offset downwardly from the rotational center axis AL in an amount of eccentricity e. The eccentric carrier 24 has a chamber 24a as a hollow space formed around the eccentric axis EL, and a unit of the first eccentric ring gear 21, the second eccentric ring gear 22, and the third eccentric ring gear 23 is held in the chamber 24a in a rotatable manner. To this end, specifically, a roller bearing (or a needle bearing) 25 is interposed between an inner circumferential surface 24b of the eccentric carrier 24 and outer circumferential surfaces 21a, 22a, and 23a of the unit of the first eccentric ring gear 21, the second eccentric ring gear 22, and the third eccentric ring gear 23.

Thus, the differential mechanism 3 of the differential assembly D is a complex planetary gear set comprising three sets of internal contact type planetary gear sets commonly using the eccentric carrier 24. In the complex planetary gear set, specifically, a first planetary gear set comprises the first gear 4 and the first eccentric gear 7, a second planetary gear set comprises the second gear 5 and the second eccentric gear 8, and a third planetary gear set comprises the third gear 6 and the third eccentric gear 9. In other words, the differential mechanism 3 is a complex planetary gear set comprising: a first complex planetary gear set formed by combining the first planetary gear set with the third planetary gear set; and a second complex planetary gear set formed by combining the second planetary gear set with the third planetary gear set. Such internal contact type planetary gear set does not have a planetary pinion, therefore, a structure of the internal contact type planetary gear set is simpler than that of a conventional planetary gear set in which a planetary pinion is interposed between a sun gear and a ring gear. In the complex planetary gear set according to the first example, a relatively large speed reducing ratio may be achieved among the third gear 6, the first gear 4, and the second gear 5.

According to the first example, the eccentric carrier 24 is connected to a control motor 27 through a speed reducing planetary gear set 28 so that the differential unit 11 is allowed to serve as a torque vectoring device. In addition, the differential unit 11 further comprises a speed increasing planetary gear set 29 so that it is possible to improve a power transmission efficiency by preventing a passive rotation of the control motor 27 while the vehicle travels along a straight line.

Thus, in the differential assembly D, the first rotary shaft 1, the second rotary shaft 2, and the differential mechanism 3 serve as the differential unit 11. In the differential unit 11, a drive torque generated by the prime mover is applied to the third sun gear 15, and the drive torque is distributed to the first rotary shaft 1 through the first sun gear 13 and the second rotary shaft 2 through the second sun gear 14. For example, given that the first rotary shaft 1 and the second rotary shaft 2 are rotated at a same speed, the first rotary shaft 1, the second rotary shaft 2, and the differential mechanism 3 are rotated integrally. In this case, the drive torque is distributed equally to the first rotary shaft 1 and the second rotary shaft 2. By contrast, given that the first rotary shaft 1 and the second rotary shaft 2 are rotated at different speeds, the first rotary shaft 1 and the second rotary shaft 2 are rotated differentially in opposite directions.

In order to allow the first rotary shaft 1 and the second rotary shaft 2 to rotate in opposite directions, a gear ratio between the first gear 4 and the first eccentric gear 7, a gear ratio between the second gear 5 and the second eccentric gear 8, and a gear ratio between the third gear 6 and the third eccentric gear 9 are set to different values. That is, according to the first example, a gear ratio between the first sun gear 13 and the first eccentric ring gear 21, a gear ratio between the second sun gear 14 and the second eccentric ring gear 22, and a gear ratio between the third sun gear 15 and the third eccentric ring gear 23 are set to different values. According to the present disclosure, a ratio of the number of teeth of the first eccentric gear 7 to the number of teeth of the first gear 4 will be referred to as a first gear ratio $u_1$ between the first gear 4 and the first eccentric gear 7, a ratio of the number of teeth of the second eccentric gear 8 to the number of teeth of the second gear 5 will be referred to as a second gear ratio $u_2$ between the second gear 5 and the second eccentric gear 8, and a ratio of the number of teeth of the third eccentric gear 9 to the number of teeth of the third gear 6 will be referred to as a third gear ratio $u_3$ between the third gear 6 and the third eccentric gear 9. That is, according to the first example, a ratio of the number of teeth $z_{r21}$ of the first eccentric ring gear 21 to the number of teeth $z_{s13}$ of the first sun gear 13 will be referred to as the first gear ratio $u_1$, a ratio of the number of teeth $z_{r22}$ of the second eccentric ring gear 22 to the number of teeth $z_{s14}$ of the second sun gear 14 will be referred to as the second gear ratio $u_2$, and a ratio of the number of teeth $z_{r23}$ of the third eccentric ring gear 23 to the number of teeth $z_{s15}$ of the third sun gear 15 will be referred to as the third gear ratio $u_3$.

According to the first example, the number of teeth $z_{s13}$ of the first sun gear 13, the number of teeth $z_{s14}$ of the second sun gear 14, and the number of teeth $z_{s15}$ of the third sun gear 15 are 17, respectively. On the other hand, the number of teeth $z_{r21}$ of the first eccentric ring gear 21 is 19, the number of teeth $z_{r22}$ of the second eccentric ring gear 22 is 21, and the number of teeth $z_{r23}$ of the third eccentric ring gear 23 is 20. Accordingly, the first gear ratio $u_1$ may be expressed as:

$$u_1 = z_{s13}/z_{r21} = 17/19 \approx 0.895;$$

the second gear ratio $u_2$ may be expressed as:

$$u_2 = z_{s14}/z_{r22} = 17/21 \sqrt{} 0.809;\text{ and}$$

the third gear ratio $u_3$ may be expressed as:

$$u_3 = z_{s15}/zr_{23} = 17/20 \approx 0.85.$$

As described, the number of teeth $z_{s13}$ of the first sun gear 13, the number of teeth $z_{s14}$ of the second sun gear 14, and the number of teeth $z_{s15}$ of the third sun gear 15 are equal to one another. On the other hand, the number of teeth $z_{r21}$ of the first eccentric ring gear 21 is one less than the number of teeth $z_{r23}$ of the third eccentric ring gear 23, and the number of teeth $z_{r22}$ of the second eccentric ring gear 22 is one more than the number of teeth $z_{r23}$ of the third eccentric ring gear 23. For these reasons, the first gear ratio $u_1$, the second gear ratio $u_2$, and the third gear ratio $u_3$ are slightly different from one another.

As described, in the differential assembly D, the first complex planetary gear set is combined with the second complex planetary gear set to serve as the differential mechanism 3. According to the first example, the first complex planetary gear set comprises the first sun gear 13, the third sun gear 15, the first eccentric ring gear 21, and the third eccentric ring gear 23. On the other hand, the second complex planetary gear set comprises the second sun gear 14, the third sun gear 15, the second eccentric ring gear 22, and the third eccentric ring gear 23.

Thus, in the first complex planetary gear set, the first gear ratio $u_1$ and the third gear ratio $u_3$ are slightly different from each other. Given that the first gear ratio $u_1$ and the third gear ratio $u_3$ are equal to each other, a speed reducing ratio of the first complex planetary gear set as a speed ratio of an output element to an input element would reach an infinite value. Specifically, an inverse number of a ratio of a speed of the first sun gear 13 to a speed of the third sun gear 15 would reach an infinite value, and the first complex planetary gear set would not function properly. Whereas, since the first gear ratio $u_1$ and the third gear ratio $u_3$ are set to different values, the speed reducing ratio of the first complex planetary gear set can be increased without reaching the infinite value. For example, the speed reducing ratio of the first complex planetary gear set may be reduced by increasing the difference between the first gear ratio $u_1$ and the third gear ratio $u_3$. By contrast, the speed reducing ratio of the first complex planetary gear set may be increased by reducing the difference between the first gear ratio $u_1$ and the third gear ratio $u_3$.

Likewise, in the second complex planetary gear set, the second gear ratio $u_2$ and the third gear ratio $u_3$ are slightly different from each other. Given that the second gear ratio $u_2$ and the third gear ratio $u_3$ are equal to each other, a speed reducing ratio of the second complex planetary gear set as an inverse number of a ratio of a speed of the second sun gear 14 to a speed of the third sun gear 15 would reach an infinite value, and the second complex planetary gear set would not function properly. Whereas, since the second gear ratio $u_2$ and the third gear ratio $u_3$ are set to different values, the speed reducing ratio of the second complex planetary gear set can be increased without reaching the infinite value. For example, the speed reducing ratio of the second complex planetary gear set may be reduced by increasing the difference between the second gear ratio $u_2$ and the third gear ratio $u_3$. By contrast, the speed reducing ratio of the second complex planetary gear set may be increased by reducing the difference between the second gear ratio $u_2$ and the third gear ratio $u_3$.

As described, in the differential assembly D serving as the differential unit 11, the drive torque applied to the third sun gear 15 is distributed to the first rotary shaft 1 through the first sun gear 13 and the second rotary shaft 2 through the second sun gear 14. For example, given that the first rotary shaft 1 and the second rotary shaft 2 are rotated at a same speed, the first rotary shaft 1 and the second rotary shaft 2 are rotated integrally.

As also described, the number of teeth $z_{r21}$ of the first eccentric ring gear 21 is one less than the number of teeth $z_{r23}$ of the third eccentric ring gear 23. Therefore, given that the first rotary shaft 1 and the second rotary shaft 2 are rotated at the same speed, a rotational speed of the first sun gear 13 meshing with the first eccentric ring gear 21 is reduced slower than a rotational speed of the third sun gear 15 meshing with the third eccentric ring gear 23 due to the fact that the number of teeth $z_{r21}$ of the first eccentric ring gear 21 is one less than the number of teeth $z_{r23}$ of the third eccentric ring gear 23. On the other hand, the number of teeth $z_{r22}$ of the second eccentric ring gear 22 is one more than the number of teeth $z_{r23}$ of the third eccentric ring gear 23. In this situation, therefore, a rotational speed of the second sun gear 14 meshing with the second eccentric ring gear 22 is increased higher than a rotational speed of the third sun gear 15 meshing with the third eccentric ring gear 23 by the one more tooth of the third eccentric ring gear 23. Consequently, the first sun gear 13 and the second sun gear 14 are rotated in opposite directions. In this situation, the first eccentric ring gear 21, the second eccentric ring gear 22, and the third eccentric ring gear 23 rotate around the eccentric axis EL and revolve around first sun gear 13, the second sun gear 14, and the third sun gear 15 rotating around the rotational center axis AL. Therefore, torques are applied to an engagement site between the first sun gear 13 and the first eccentric ring gear 21, and to an engagement site between the second sun gear 14 and the second eccentric ring gear 22 in opposite directions thereby causing interference between those engagement sites. As a result, the differential assembly D is substantially brought into engagement to rotate integrally so that the first rotary shaft 1 and the second rotary shaft 2 are rotated integrally without rotating relatively to each other.

By contrast, given that the first rotary shaft 1 on which the first sun gear 13 is mounted and the second rotary shaft 2 on which the second sun gear 14 is mounted are rotated at different speeds, the differential assembly D will not be brought into engagement by such interference between the above-mentioned engagement sites. In this case, the drive torque is distributed from the third sun gear 15 to the first sun gear 13 and to the second sun gear 15 while rotating the first sun gear 13 and the second sun gear 14 relatively to each other. Consequently, torques are applied to the engagement site between the first sun gear 13 and the first eccentric ring gear 21 and to the engagement site between the second sun gear 14 and the second eccentric ring gear 22 in opposite directions, thereby rotating the first sun gear 13 and the second sun gear 14 in opposite directions. That is, the rotational direction of the second sun gear 14 is reversed to the opposite direction to the rotational direction of the first sun gear 13. As a result, the first rotary shaft 1 and the second rotary shaft 2 are rotated differentially in opposite directions.

Thus, the differential assembly D comprises three sets of the internal contact type planetary gear sets. In the differential assembly D, the drive torque delivered from the prime mover is distributed to the first rotary shaft 1 and the second rotary shaft, and a speed difference between the first rotary shaft 1 and the second rotary shaft 2 is absorbed by the differential mechanism 3. For this reason, the differential assembly D may serve as a compact differential unit having a simple structure.

As illustrated in FIG. 2, the eccentric carrier 24 is a cylindrical member, and a thickness of an upper section of the eccentric carrier 24 in FIG. 2 is increased thicker than the remaining section to serve as a counterbalance weight 26. Thus, according to the example shown in FIG. 2, the counterbalance weight 26 is formed integrally with the eccentric carrier 24 while adjusting a weight to a desirable value. Instead, the counterbalance weight 26 may also be formed separately to be attached to an outer circumferential surface of the eccentric carrier 24.

As explained above, the internal gears such as the first eccentric ring gear 21, the second eccentric ring gear 22, and the third eccentric ring gear 23 rotate (or revolve) eccentrically about the external gears such as the first sun gear 13, the second sun gear 14, and the third sun gear 15. Consequently, the eccentric carrier 24 rotates out-of-balance due to imbalance of weight of the unit of the internal gears revolving around the rotational center axis AL. In order to correct such unbalance of rotation of the eccentric carrier 24, the counterbalance weight 26 is formed on the eccentric carrier 24. To this end, for example, the counterbalance weight 26 is formed on the eccentric carrier 24 at a site out of phase with a heaviest portion of the unit of the internal gears by 180 degrees. According to the first example, gear teeth are not formed on outer circumferential surfaces 21a, 22a, and 23a of the eccentric ring gears 21, 22, and 23. Therefore, an outer diameter of the unit of the first eccentric ring gear 21, the second eccentric ring gear 22, and the third eccentric ring gear 23 may be reduced so that a space for the counterbalance weight 26 may be ensured on the outer circumferential surface of the eccentric carrier 24. Thus, rotations of the rotary members in the differential mechanism 3 may be stabilized by the counterbalance weight 26.

The differential assembly D is provided with an actuator (or a prime mover) to serve as a torque vectoring device that causes a differential rotation in the differential mechanism 3.

According to the first example, a control motor 27 as an electric motor is adopted as the actuator to generate a control torque for controlling a differential rotation between the first rotary shaft 1 and the second rotary shaft 2. For example, an induction motor and a permanent magnet synchronous motor may be adopted as the control motor 27, and the control motor 27 is arranged coaxially with the first rotary shaft 1 and the second rotary shaft 2.

The control motor 27 comprises a rotor 27a, and an output shaft 27b as a rotary shaft of the rotor 27a. The output shaft 27b is connected to the eccentric carrier 24 through an after-mentioned speed reducing planetary gear set 28.

As described, the drive torque applied to the third sun gear 15 is distributed to the first rotary shaft 1 through the first sun gear 13 and the second rotary shaft 2 through the second sun gear 14. Whereas, the control torque of the control motor 27 is delivered to the eccentric carrier 24. The control torque delivered to the eccentric carrier 24 is distributed to the first sun gear 13 and the second sun gear 14 while being multiplied, and further delivered to the first rotary shaft 1 and the second rotary shaft 2. Consequently, the first rotary shaft 1 and the second rotary shaft 2 are rotated in a differential manner in opposite directions.

According to the first example, a speed reducing ratio between the eccentric carrier 24 and the first sun gear 13 is referred to as a first speed reducing ratio, and a speed reducing ratio between the eccentric carrier 24 and the second sun gear 14 is referred to as a second speed reducing ratio. In the differential assembly D according to the first example, the first speed reducing ratio and the second speed reducing ratio are equal or approximated to each other. In other words, the first speed reducing ratio is an inverse number of a ratio of a rotational speed of the first sun gear 13 to a rotational speed of the eccentric carrier 24, and the second speed reducing ratio is an inverse number of a ratio of a rotational speed of the second sun gear 14 to a rotational speed of the eccentric carrier 24.

In the differential assembly D according to the first example, rotational speeds of both of the first sun gear 13 and the second sun gear 14 are reduced with respect to a rotational speed of the eccentric carrier 24. That is, an absolute value of each of the first speed reducing ratio and the second speed reducing ratio is individually greater than 1. In the differential assembly D, therefore, the control torque applied to the eccentric carrier 24 from the control motor 27 is delivered to the first sun gear 13 and the second sun gear 14 while being multiplied.

As described, in the differential assembly D shown in FIG. 1, the number of teeth $z_{r21}$ of the first eccentric ring gear 21 is 20, the number of teeth $z_{r22}$ of the second eccentric ring gear 22 is 21, the number of teeth $z_{r23}$ of the third eccentric ring gear 23 is 19, the number of teeth $z_{s13}$ of the first sun gear 13 is 17, the number of teeth $z_{s14}$ of the second sun gear 14 is 17, and the number of teeth $z_{s15}$ of the third sun gear 15 is 17. Accordingly, the first speed reducing ratio $R_1$ between the eccentric carrier 24 and the first sun gear 13 may be expressed as:

$$R_1 = 1/\{1-(z_{r21}/z_{s13})\cdot(z_{s15}/z_{r23})\} = 1/\{1-(19/17)\cdot(17/20)\} = 20.$$

In general, speed reducing ratios achieved by the conventional planetary gear sets falls within a range of approximately 4 to 10. Thus, the first speed reducing ratio $R_1$ is greater than the speed reducing ratios of the conventional planetary gear sets.

Likewise, the second speed reducing ratio $R_2$ between the eccentric carrier 24 and the second sun gear 14 may be expressed as:

$$R_2 = 1/\{1-(z_{r22}/z_{s14})\cdot(z_{s15}/z_{s23})\} = 1/\{1-(21/17)\cdot(17/20)\} = -20.$$

Thus, the second speed reducing ratio $R_2$ is also greater than the speed reducing ratios of the conventional planetary gear sets. As a result of applying the control torque to the eccentric carrier 24, a rotational direction of the second sun gear 14 serving as an output element is reversed to the opposite direction to the rotational direction of the eccentric carrier 24 serving as an input element. Therefore, the second speed reducing ratio $R_2$ is referred to as a negative value (e.g., −20) for the sake of convenience, and in the first example shown in FIG. 1, the speed reducing ratio R is indicated commonly as R−±20.

Thus, in the differential assembly D shown in FIG. 1, the first sun gear 13 and the second sun gear 14 are rotated differentially in opposite directions by rotating the eccentric carrier 24 by the control torque. As described, the first speed reducing ratio $R_1$ as the ratio of a rotational speed of the first sun gear 13 to a rotational speed of the eccentric carrier 24 and the second speed reducing ratio $R_2$ as the ratio of a rotational speed of the second sun gear 14 to a rotational speed of the eccentric carrier 24 are equal or approximated to each other. In the differential assembly D shown in FIG. 1, therefore, the control torque generated by the control motor 27 is delivered to the first sun gear 13 and the second sun gear 14 while being multiplied by substantially same amplification factors.

In the differential assembly D shown in FIG. 1, the eccentric carrier 24 as the input element is rotated in the forward direction when the control motor 27 is rotated in the forward direction (i.e., clockwise). In this situation, the first sun gear 13 as the output element is rotated in the forward direction, and the second sun gear 14 is rotated in the reverse direction (i.e., counterclockwise). According to the present disclosure, the second speed reducing ratio of the differential assembly D may be changed by changing the numbers of teeth of the gears 4, 5, and 6, and the eccentric gears 7, 8, and 9. In addition, the rotational directions of the first gear 4 and the second gear 5 as the output elements may be switched by changing the numbers of teeth of the gears 4, 5, and 6, and the eccentric gears 7, 8, and 9.

Thus, the differential assembly D according to the first example in which the control motor 27 is combined with the differential mechanism 3 may serve as a torque vectoring device. In the differential assembly D shown in FIG. 1, the control torque of the control motor 27 is distributed to the first rotary shaft 1 through the first sun gear 13 and to the second rotary shaft 2 through the second sun gear 14 while being multiplied. Consequently, the first sun gear 13 and the second sun gear 14 are rotated in opposite directions. That is, a distribution ratio of the drive torque to the first rotary shaft 1 connected to one of drive wheels and the second rotary shaft 2 connected to the other one of drive wheels can be controlled by changing the control torque generated by the control motor 27.

As described, the differential assembly D according to the first example comprises a complex planetary gear set formed by combining three sets of internal contact type planetary gear sets, and the speed reducing ratio between the eccentric carrier 24 and each of the first sun gear 13 and the second sun gear 14 can be increased significantly. Specifically, an absolute value of each of the first speed reducing ratio $R_1$ and the second speed reducing ratio $R_2$ is 20, respectively. According to the first example, therefore, the control torque of the control motor 27 can be multiplied by a relatively large factor so that the control motor 27 can be downsized. For this reason, the differential assembly D may serve as a compact differential unit having a simple structure.

The differential assembly D is provided with a mechanism for preventing a passive rotation of the control motor 27.

Given that the first rotary shaft 1 and the second rotary shaft 2 rotate in the same direction at the same speed, the differential mechanism 3 is rotated integrally and passively.

In this situation, if the control motor 72 is also rotated passively, a power transmitting efficiency of the differential assembly D may be reduced. In order to avoid such passive rotation of the control motor 72, the differential assembly D shown in FIG. 1 is provided with the speed reducing planetary gear set 28 and the speed increasing planetary gear set 29.

The speed reducing planetary gear set 28 is arranged between the control motor 27 and the eccentric carrier 24 to multiply the control torque applied to the eccentric carrier 24 from the control motor 27. Specifically, when the differential ring gear 17, the first rotary shaft 1, and the second rotary shaft 2 are rotated integrally, the speed reducing planetary gear set 28 reduces a rotational speed of the eccentric carrier 24 slower than a rotational speed of the output shaft 27b of the control motor 27.

Specifically, the speed reducing planetary gear set 28 is a single-pinion planetary gear set formed coaxially with the first rotary shaft 1 and the second rotary shaft 2. The speed reducing planetary gear set 28 comprises a reduction sun gear 28a, a reduction ring gear 28b, a reduction carrier 28c, and a planetary gear 28d.

The reduction sun gear 28a is formed around one end of the hollow output shaft 27b of the control motor 27 supported by the case 12 in a rotatable manner so that the reduction sun gear 28a is rotated integrally with the output shaft 27b.

The reduction ring gear 28b as an internal gear is meshed with the planetary gear 28d while being supported by the case 12 in a rotatable manner. Specifically, the reduction ring gear 28b is connected to an after-mentioned speed increasing ring gear 29b of the speed increasing planetary gear set 29 through a connection member 30 as a cover member covering the differential mechanism 3. That is, the reduction ring gear 28b is rotated integrally with the connection member 30 and the speed increasing ring gear 29b.

The reduction carrier 28c supports the planetary gear 28d in a rotatable manner. Specifically, the reduction carrier 28c is joined to the eccentric carrier 24 of the differential assembly D so that the reduction carrier 28c is rotated integrally with the eccentric carrier 24. As explained later, when the differential ring gear 17, the first rotary shaft 1, and the second rotary shaft 2 rotate integrally, a rotational speed of the reduction carrier 28c is reduced lower than a rotational speed of the reduction ring gear 28b.

Specifically, when the reduction sun gear 28a is rotated by the control torque delivered from the output shaft 27b, the reduction ring gear 28b serves as a reaction element of the speed reducing planetary gear set 28 so that a rotational speed of the reduction carrier 28c is reduced lower than a rotational speed of the reduction sun gear 28a. That is, the speed reducing planetary gear set 28 serves as a speed reducing mechanism of the control motor 27 so that the control torque of the control motor 27 is delivered to the eccentric carrier 24 while being multiplied by the speed reducing planetary gear set 28.

As indicated in FIG. 1, the number of teeth of the reduction sun gear 28a is 34, the number of teeth of the reduction ring gear 28b is 68, and the number of teeth of the planetary gear 28d is 17. Accordingly, a speed reducing ratio of the speed reducing planetary gear set 28 is 3. Therefore, based on the fact that the speed reducing ratio R of the differential assembly D shown in FIG. 1 (i.e., the first speed reducing ratio $R_1$ and the second speed reducing ratio $R_2$) is ±20, an actual speed reducing ratio R' of the differential assembly D shown in FIG. 1 taking into account the speed reducing ratio of the speed reducing planetary gear set 28 is:

$$R' = \pm 20 \cdot 3 = \pm 60.$$

Thus, the speed reducing ratio of the differential assembly D shown in FIG. 1 is multiplied by the speed reducing planetary gear set 28.

The speed increasing planetary gear set 29 is also a single-pinion planetary gear set arranged coaxially with the first rotary shaft 1 and the second rotary shaft 2. The speed increasing planetary gear set 29 comprises a speed increasing sun gear 29a, the speed increasing ring gear 29b, a speed increasing carrier 29c, and a planetary gear 29d.

The speed increasing sun gear 29a may be formed around a hollow shaft that is not allowed to rotate. For example, the speed increasing sun gear 29a is fitted onto a flange (not shown) formed integrally with the case 12. That is, the speed increasing sun gear 29a is not allowed to rotate.

The speed increasing ring gear 29b as an internal gear is meshed with the planetary gear 29d while being supported by the case 12 in a rotatable manner together with the reduction ring gear 28b. As described, the speed increasing ring gear 29b is connected to the reduction ring gear 28b through the connection member 30 so that the speed increasing ring gear 29b is rotated integrally with the reduction ring gear 28b. When the speed increasing carrier 29c is rotated, a rotational speed of the speed increasing ring gear 29b is increased higher than a rotational speed of the speed increasing carrier 29c.

The speed increasing carrier 29c supports the planetary gear 29d in a rotatable manner. Specifically, the speed increasing carrier 29c is connected to the differential ring gear 17 through the rotary shaft 18 of the first sun gear 13 so that the speed increasing carrier 29c is rotated integrally with the first sun gear 13 and the differential ring gear 17.

Specifically, when the speed increasing carrier 29c is rotated by the torque delivered from the differential ring gear 17, the speed increasing sun gear 29a serves as a reaction element of the speed increasing planetary gear set 29 so that a rotational speed of the speed increasing ring gear 29b is increased higher than a rotational speed of the speed increasing carrier 29c. Thus, the speed increasing planetary gear set 29 serves as a speed increasing mechanism.

As indicated in FIG. 1, the number of teeth of the speed increasing sun gear 29a is 24, the number of teeth of the speed increasing ring gear 29b is 68, and the number of teeth of the planetary gear 29d is 17. Thus, the number of teeth of the speed increasing sun gear 29a is equal to that of the reduction sun gear 28a, the number of teeth of the speed increasing ring gear 29b is equal to that of the reduction ring gear 28b, and the number of teeth of the planetary gear 29d is equal to that of the planetary gear 28d. Accordingly, a gear ratio (or speed ratio) of the speed increasing planetary gear set 29 is equal to that of the speed reducing planetary gear set 28.

As described, when the first rotary shaft 1 and the second rotary shaft 2 rotate in the same direction at the same speed, the differential assembly D shown in FIG. 1 is rotated integrally and passively. Consequently, the speed increasing carrier 29c of the speed increasing planetary gear set 29 and the reduction carrier 28c of the speed reducing planetary gear set 28 are rotated in the same direction at the same speed. In this situation, the speed increasing planetary gear set 29 in which the speed increasing sun gear 29a is fixed serves as a speed increasing mechanism to increase a rotational speed of the speed increasing ring gear 29b higher than a rotational speed of the speed increasing carrier 29c.

On the other hand, the speed reducing planetary gear set 28 serves as a speed reducing mechanism to reduce a rotational speed of the reduction carrier 28*c* lower than a rotational speed of the reduction ring gear 28*b*. As described, since the speed increasing carrier 29*c* and the reduction carrier 28*c* are rotated at the same speed, and the reduction ring gear 28*b* and the speed increasing ring gear 29*b* are connected to each other, the reduction ring gear 28*b* and the speed increasing ring gear 29*b* are also rotated at the same speed. Consequently, an absolute value of the speed increasing ratio of the speed increasing planetary gear set 29 and an absolute value of the speed reducing ratio of the speed reducing planetary gear set 28 are equalized to each other. In this situation, since a rotational speed of the speed increasing sun gear 29*a* is zero, the rotational speed of the reduction sun gear 28*a* is reduced to substantially zero that is lower than the rotational speed of the reduction ring gear 28*b*, in accordance with the gear ratio of the speed reducing planetary gear set 28. That is, since the gear ratio of the speed increasing planetary gear set 29 and the gear ratio of the speed reducing planetary gear set 28 are equal to each other, the rotational speed of the reduction sun gear 28*a* is reduced to substantially zero. Consequently, when the first rotary shaft 1 and the second rotary shaft 2 rotate in the same direction at the same speed so that the differential assembly D shown in FIG. 1 is rotated integrally and passively, a rotational speed of the output shaft 27*b* of the control motor 27 connected to the reduction sun gear 28*a* is maintained to zero. That is, a passive rotation of the control motor 27 is prevented.

By thus preventing the passive rotation of the control motor 27, a power transmission efficiency of the differential unit 11 and an energy efficiency of the vehicle can be improved. In addition, since the control motor 27 will not be rotated passively, the differential unit 11 will not be subjected to an inertia torque of the control motor 27 even if the vehicle is accelerated or decelerated abruptly while travelling in a straight line. For this reason, it is not necessary to execute an additional control to generate a cancel torque against the inertia torque of the control motor 27. That is, a torque vectoring control of the differential unit 11 using the control motor 27 can be simplified.

Figure 3:
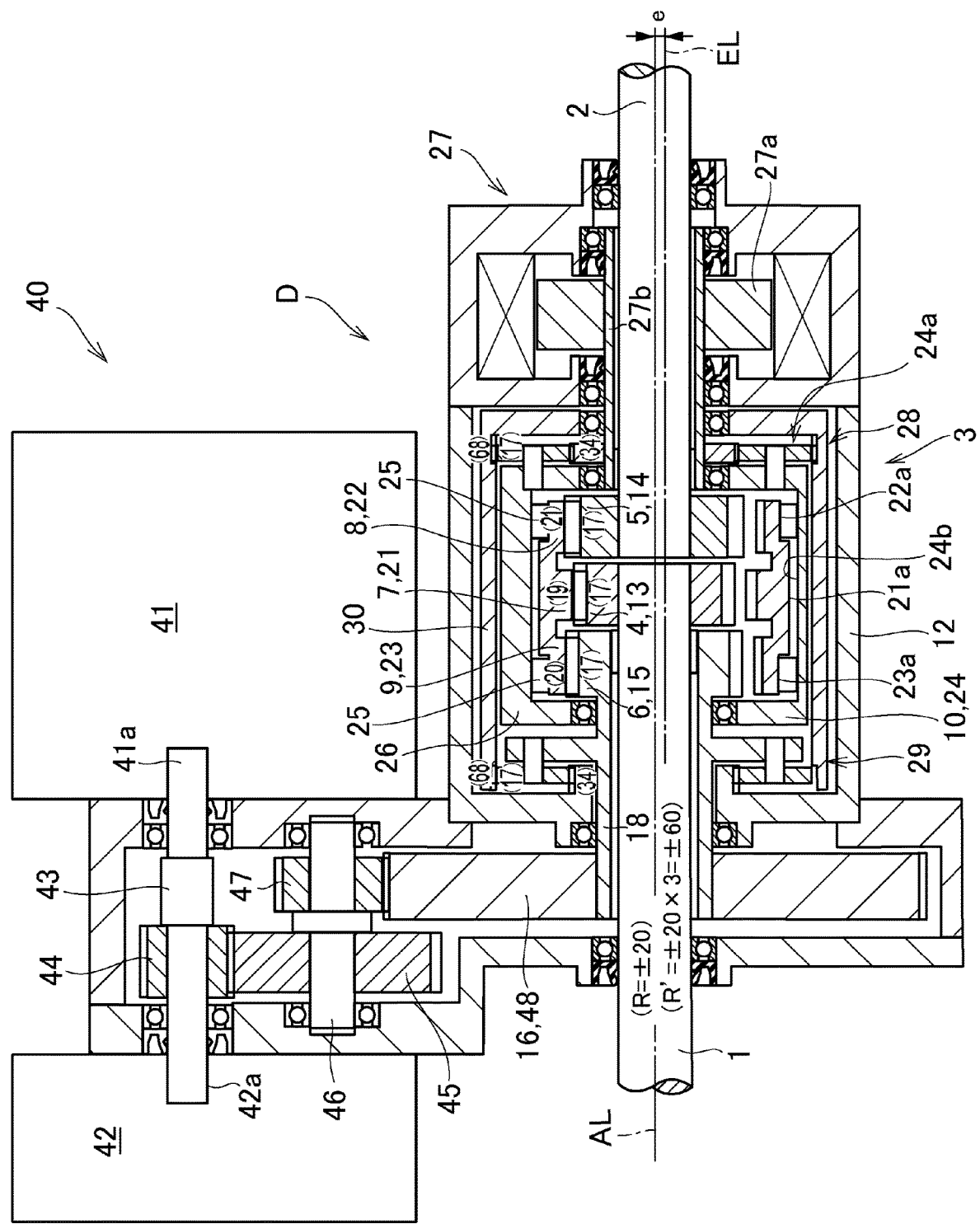
FIG. 3 is a cross-sectional view showing a structure of the differential assembly according a second example of the present disclosure.
Figure 4:
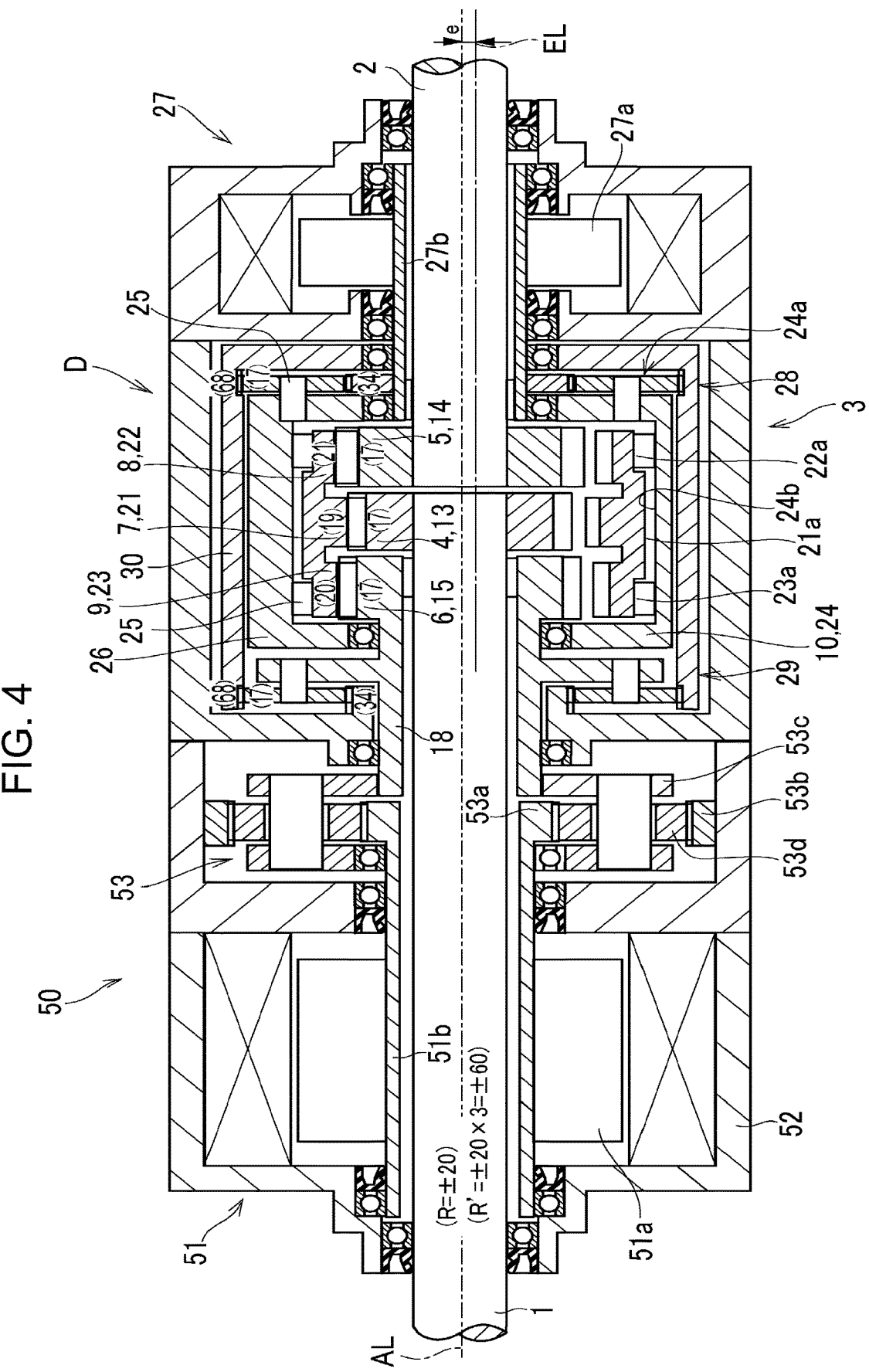
FIG. 4 is a cross-sectional view showing a structure of the differential assembly according a third example of the present disclosure.

Modifications of the differential assembly D shown in FIG. 1 are shown in FIGS. 3 and 4. In FIGS. 3 and 4, common reference numerals are assigned to the elements in common with those of the differential assembly D shown in FIG. 1.

Turing to FIG. 3, there is shown a second example as a modification example of the differential assembly D shown in FIG. 1. According to the second example, as the first example, the differential unit 11 is also combined with the prime mover to serve as a power unit 40 having a torque vectoring function.

The prime mover of the power unit 40 includes a drive motor 41 and a brake device 42. The drive motor 41 generates a drive torque to accelerate the vehicle, and a regenerative torque to decelerate the vehicle. For example, a permanent magnet type synchronous motor or an induction motor may be adopted as the drive motor 41. On the other hand, the brake device 42 generates a regenerative torque as a counter torque to apply a brake force to the vehicle. An output shaft 41*a* of the drive motor 41 and a rotary shaft 42*a* of the brake device 42 are connected to each other through a connection shaft 43. For example, the brake device 42 includes: an electromagnetic brake that applies a braking force to a rotary member by electrically generated magnetic attraction; an electric brake that applies a frictional braking force to a rotary member by a feed screw mechanism actuated by a motor; and a regenerative brake that applies a braking force derived from a resistance to a rotary member by regenerating electricity by a motor. Thus, the differential assembly D shown in FIG. 3 is combined with the drive motor assembly having a braking function.

A pinion 44 is mounted on the rotary shaft 42*a* to be rotated integrally with the rotary shaft 42*a*. A counter shaft 46 extends radially inner side of a unit of the output shaft 41*a*, the connection shaft 43, and the rotary shaft 42*a* in parallel therewith while being supported by the case 12 in a rotatable manner. A first counter gear 45 is mounted on the counter shaft 46 to be meshed with the pinion 44, and a second counter gear 47 is also mounted on the counter shaft 46. The first counter gear 45, the counter shaft 46, and the second counter gear 47 are rotated entirely integrally. The second counter gear 47 is meshed with an input gear 48 mounted on the rotary shaft 18 of the third sun gear 15 to be rotated integrally with the third sun gear 15. In the differential assembly D shown in FIG. 3, the input gear 48 serves as the input member 16.

The first counter gear 45 is diametrically larger than the pinion 44, and the number of teeth of the first counter gear 45 is larger than the number of teeth of the pinion 44. Whereas, the second counter gear 47 is diametrically smaller than the input gear 48, and the number of teeth of the second counter gear 47 is smaller than the number of teeth of the input gear 48. That is, the pinion 44, the first counter gear 45, the second counter gear 47, and the input gear 48 serve as a reduction gear set to reduce a speed of the input gear 48 slower than a speed of the pinion 44. In other words, a torque of the drive motor 41 or the brake device 42 applied to the connection shaft 43 is delivered to the first sun gear 13 of the differential assembly D while being multiplied by the reduction gear set.

Thus, according to the second example, the differential assembly D shown in FIG. 3 is combined with the drive motor 41 and the brake device 42 to serve as the power unit 40 having the torque vectoring function. Here, it is to be noted that any one of the drive motor 41 and the brake device 42 may be omitted. In this case, the power unit 40 serves as a motor drive unit or a brake unit having a torque vectoring function.

Turning to FIG. 4, there is shown a third example also as a modification example of the differential assembly D shown in FIG. 1. According to the third example, the differential assembly D shown in FIG. 4 is adapted to serve as a center differential mechanism 50 that is to be mounted on a four-wheel drive layout vehicle. In the center differential mechanism 50, the first rotary shaft 1 and the second rotary shaft 2 extend coaxially with each other along a longitudinal direction of the vehicle.

The center differential mechanism 50 comprises a drive motor 51 formed around the first rotary shaft 1. The drive motor 51 serves as a prime mover that generates a torque to rotate or brake the first rotary shaft 1 and the second rotary shaft 2. To this end, for example, a permanent magnet type synchronous motor or an induction motor may be adopted as the drive motor 51.

The drive motor 51 comprises a hollow rotor shaft 51*b* that is supported by a case 52 in a rotatable manner, and a hollow rotor 51*a* that is mounted on the rotor shaft 51*b*. The drive motor 51 is held in the case 52, and the case 52 is joined to the case holding the differential assembly D and the control motor 27. The first rotary shaft 1 penetrates through a hollow space of the rotor shaft 51*b* while being allowed to rotate relatively with the rotor shaft 51*b*.

The rotor shaft 51*b* is connected to the third sun gear 15 through a reduction gear set 53 so that an output torque of the drive motor 51 is delivered to the third sun gear 15 while being multiplied by the reduction gear set 53. Specifically, the reduction gear set 53 as a single-pinion planetary gear set comprises a sun gear 53*a*, a ring gear 53*b*, a carrier 53*c*, and a planetary gear 53*d*.

The sun gear 53*a* is formed around one end of the rotor shaft 51*b* to be rotated integrally with the rotor shaft 51*b*. The ring gear 53*b* as an internal gear meshing with the planetary gear 53*d* is fixed to an inner surface of the case 52. That is, the ring gear 53*b* is not allowed to rotate. The carrier 53*c* supporting the planetary gear 53*d* in a rotatable manner is mounted on the rotary shaft 18 of the third sun gear 15 of the differential assembly D to be rotated integrally with the third sun gear 15.

When the torque of the drive motor 51 is delivered to the sun gear 53*a*, the ring gear 53*b* serves as a reaction element of the reduction gear set 53 so that a rotational speed of the carrier 53*c* connected to the first sun gear 13 is reduced slower than a rotational speed of the sun gear 53*a*. That is, the torque of the drive motor 51 is delivered to the third sun gear 15 while being multiplied by the reduction gear set 53.

Thus, according to the third example, the differential assembly D shown in FIG. 4 may be arranged coaxially with the drive motor 51 to serve as the center differential mechanism 50. As described, the center differential mechanism 50 may be mounted on a four-wheel drive layout vehicle to serve as a compact power unit having a torque vectoring function.

Figure 5:
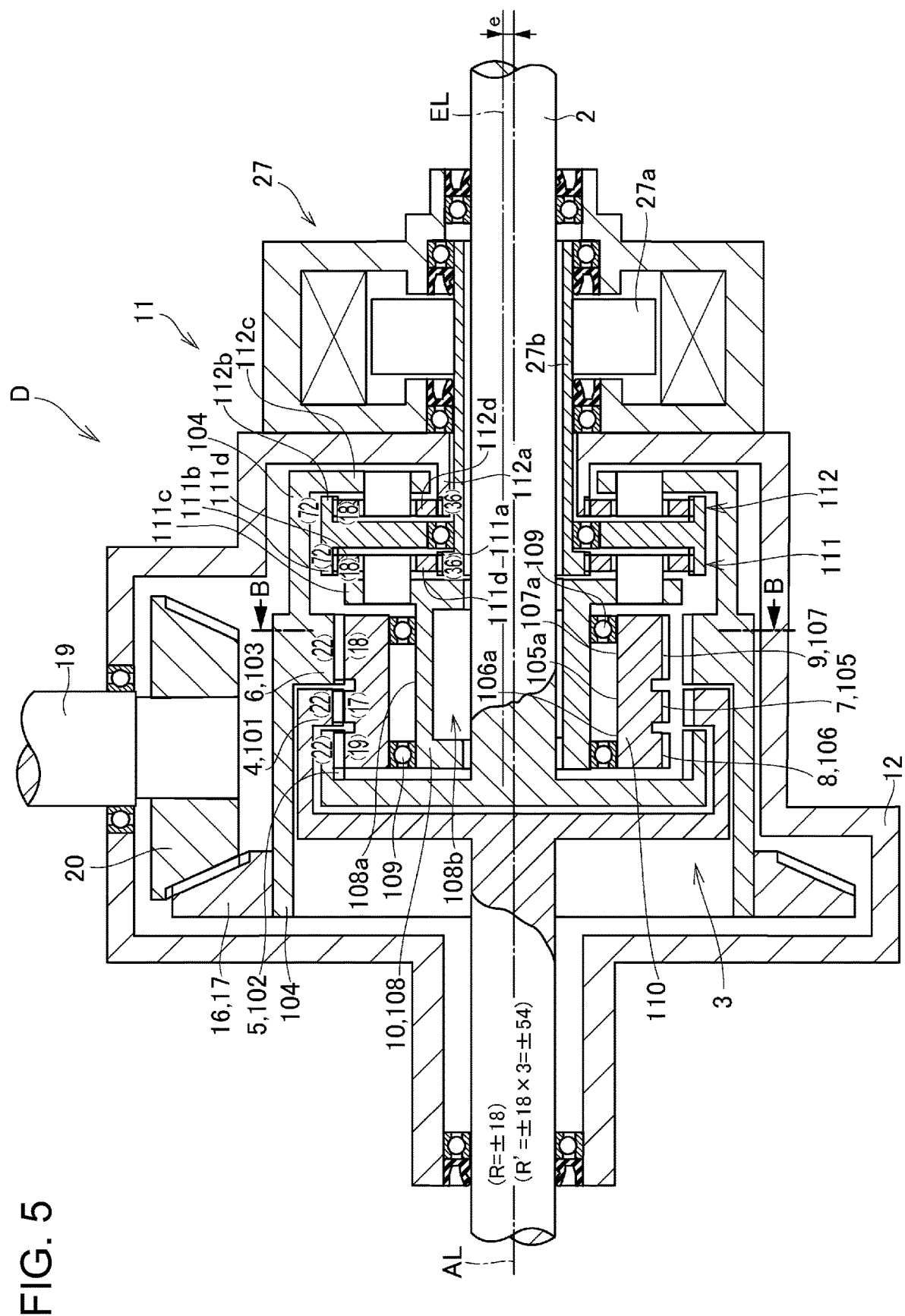
FIG. 5 is a cross-sectional view showing a structure of the differential assembly according a fourth example of the present disclosure.

Turning to FIG. 5, there is shown a fourth example of the differential assembly D. In the differential assembly D shown in FIG. 5, a first eccentric ring gear 105 as an external gear serves as the first eccentric gear 7, a second eccentric ring gear 106 as an external gear serves as the second eccentric gear 8, and a third eccentric ring gear 107 as an external gear serves as the third eccentric gear 9. On the other hand, a first ring gear 101 as an internal gear serves as the first gear 4, a second ring gear 102 as an internal gear serves as the second gear 5, and a third ring gear 103 as an internal gear serves as the third gear 6.

The first ring gear 101 is connected to the first rotary shaft 1 that is supported by the case 12 in a rotatable manner, and the second ring gear 102 is connected to the second rotary shaft 2 that is supported by the case 12 in a rotatable manner. That is, the first ring gear 101 is rotated integrally with the first rotary shaft 1, and the second ring gear 102 is integrally with the second rotary shaft 2.

The third ring gear 103 is connected to the input member 16 to which the drive torque is applied from the prime mover. As described, the prime mover includes not only an engine and a drive motor but also a brake device. That is, not only a drive torque to propel the vehicle but also a brake torque to decelerate the vehicle is applied to the input member 16.

In the differential assembly D shown in FIG. 5, the differential ring gear 17 also serves as the input member 16. The differential ring gear 17 is fitted onto a rotary shaft 104 of the third ring gear 103 so that the differential ring gear 17, the rotary shaft 104, and the third ring gear 103 are rotated integrally. Specifically, the differential ring gear 17 as a diametrically larger bevel gear is meshed with the drive pinion 20 as a diametrically smaller bevel gear that is fitted onto a leading end of the propeller shaft 19 of the vehicle. The number of teeth of the drive pinion 20 is less than the number of teeth of the differential ring gear 17. That is, the drive pinion 20 and the differential ring gear 17 serve as a final reduction gear unit of the vehicle. The other end of the propeller shaft 19 (not shown) is joined to the prime mover of the vehicle. Thus, the differential unit 11 is connected to the prime mover of the vehicle though the differential ring gear 17 and the propeller shaft 19.

The second eccentric gear 8, the first eccentric gear 7, and the third eccentric gear 9, are formed in order to rotate integrally around an eccentric axis EL which extends parallel to the rotational center axis AL.

According to the fourth example, the first eccentric ring gear 105 serving as the first eccentric gear 7 meshes with the first ring gear 101 serving as the first gear 4, the second eccentric ring gear 106 serving as the second eccentric gear 8 meshes with the second ring gear 102 serving as the second gear 5, and the third eccentric ring gear 107 serving as the third eccentric gear 9 meshes with the third ring gear 103 serving as the third gear 6.

That is, the first eccentric ring gear 105 rotates around the eccentric axis EL and revolves along the first ring gear 101 around the rotational center axis AL, the second eccentric ring gear 106 rotates around the eccentric axis EL and revolves along the second ring gear 102 around the rotational center axis AL, and the third eccentric ring gear 107 rotates around the eccentric axis EL and revolves along the third ring gear 103 around the rotational center axis AL. Thus, the second eccentric gear 8, the first eccentric gear 7, and the third eccentric gear 9 revolves and rotates integrally.

The eccentric member 10 is also arranged around the rotational center axis AL, and the first eccentric gear 7, the second eccentric gear 8, and the third eccentric gear 9 are supported by the eccentric member 10 while being allowed to revolve around the rotational center axis AL and to rotate around the eccentric axis EL. In the differential assembly D shown in FIG. 5, an eccentric cam 108 is adopted as the eccentric member 10 to support the first eccentric ring gear 105, the second eccentric ring gear 106, and the third eccentric ring gear 107 from radially inner side.

Figure 6:
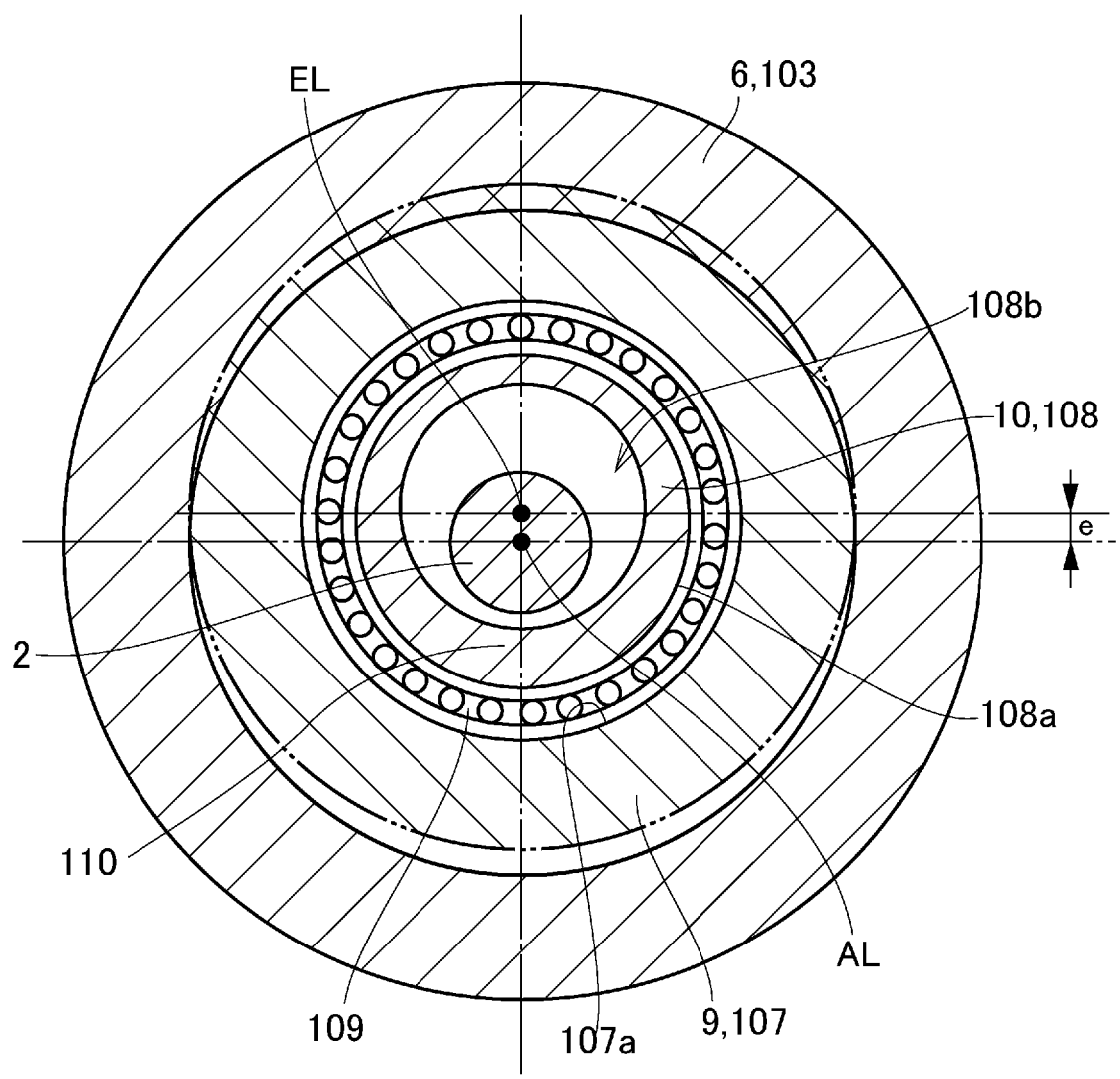
FIG. 6 is a cross-sectional view showing a cross-section of the differential mechanism along B-B line in FIG. 5.

Specifically, the eccentric cam 108 is a disc-shaped or cylindrical rotary member, and is arranged concentrically around the first rotary shaft 1 and the second rotary shaft 2. The eccentric cam 108 is supported by bearings (not shown) in such a manner as to rotate relatively to the first rotary shaft 1 and the second rotary shaft 2, and also supported by the case 12 through another bearing (not shown) in a rotatable manner. As illustrated in FIGS. 5 and 6, the eccentric axis EL extends parallel to the rotational center axis AL of the eccentric cam 108 and is offset from the rotational center axis AL. In the example shown in FIG. 6, the eccentric axis EL is offset upwardly from the rotational center axis AL in an amount of eccentricity e. A ball bearing 109 is interposed between an outer circumferential surface 108*a* of the eccentric cam 108 and an inner circumferential surfaces 105*a*, 106*a*, and 106*a* of a unit of the first eccentric ring gear 105, the second eccentric ring gear 106, and the third eccentric ring gear 107. Therefore, the unit of unit of the first eccentric ring gear 105, the second eccentric ring gear 106, and the third eccentric ring gear 107 is supported by the eccentric cam 108 while being allowed to rotate integrally around the eccentric cam 108.

Thus, the differential mechanism 3 of the differential assembly D shown in FIG. 5 is also a complex planetary gear set comprising three sets of internal contact type planetary gear sets commonly using the eccentric cam 108. In the complex planetary gear set, specifically, a first planetary gear set comprises the first gear 4 and the first eccentric gear 7, a second planetary gear set comprises the second gear 5 and the second eccentric gear 8, and a third planetary gear set comprises the third gear 6 and the third eccentric gear 9. In other words, the differential mechanism 3 is a complex planetary gear set comprising: a first complex planetary gear set formed by combining the first planetary gear set with the third planetary gear set; and a second complex planetary gear set formed by combining the second planetary gear set with the third planetary gear set. Such internal contact type planetary gear set does not have a planetary pinion, therefore, a structure of the internal contact type planetary gear set is simpler than that of a conventional planetary gear set in which a planetary pinion is interposed between a sun gear and a ring gear. In the complex planetary gear set according to the fourth example, a relatively large speed reducing ratio may be achieved among the third gear 6, the first gear 4, and the second gear 5.

According to the fourth example, the eccentric cam 108 is connected to the control motor 27 through a speed reducing planetary gear set 111 so that the differential unit 11 is allowed to serve as a torque vectoring device. In addition, the differential unit 11 further comprises a speed increasing planetary gear set 112 so that it is possible to improve a power transmission efficiency by preventing a passive rotation of the control motor 27 while the vehicle travels along a straight line.

As described, in the differential assembly D, the first rotary shaft 1, the second rotary shaft 2, and the differential mechanism 3 serve as the differential unit 11. In the differential unit 11 shown in FIG. 5, a drive torque generated by the prime mover is applied to the third ring gear 103, and the drive torque is distributed to the first rotary shaft 1 through the first ring gear 101 and the second rotary shaft 2 through the second ring gear 102. For example, given that the first rotary shaft 1 and the second rotary shaft 2 are rotated at a same speed in the same direction, the first rotary shaft 1, the second rotary shaft 2, and the differential mechanism 3 are rotated integrally. In this case, the drive torque is distributed equally to the first rotary shaft 1 and the second rotary shaft 2. By contrast, given that the first rotary shaft 1 and the second rotary shaft 2 are rotated at different speeds, the first rotary shaft 1 and the second rotary shaft 2 are rotated differentially in opposite directions.

In order to allow the first rotary shaft 1 and the second rotary shaft 2 to rotate in opposite directions, a gear ratio between the first gear 4 and the first eccentric gear 7, a gear ratio between the second gear 5 and the second eccentric gear 8, and a gear ratio between the third gear 6 and the third eccentric gear 9 are set to different values. That is, according to the fourth example, a gear ratio between the first ring gear 101 and the first eccentric ring gear 105, a gear ratio between the second ring gear 102 and the second eccentric ring gear 106, and a gear ratio between the third ring gear 103 and the third eccentric ring gear 107 are set to different values. As mentioned above, the ratio of the number of teeth of the first eccentric gear 7 to the number of teeth of the first gear 4 is referred to as the first gear ratio $u_1$ between the first gear 4 and the first eccentric gear 7, the ratio of the number of teeth of the second eccentric gear 8 to the number of teeth of the second gear 5 is referred to as the second gear ratio 112 between the second gear 5 and the second eccentric gear 8, and the ratio of the number of teeth of the third eccentric gear 9 to the number of teeth of the third gear 6 is referred to as the third gear ratio $u_3$ between the third gear 6 and the third eccentric gear 9. Specifically, according to the fourth example, a ratio of the number of teeth $z_{r105}$ of the first eccentric ring gear 105 to the number of teeth $z_{r101}$ of the first ring gear 101 will be referred to as the first gear ratio u 1, a ratio of the number of teeth $z_{r100}$ of the second eccentric ring gear 106 to the number of teeth $z_{r102}$ of the second ring gear 102 will be referred to as the second gear ratio $u_2$, and a ratio of the number of teeth $z_{r107}$ of the third eccentric ring gear 107 to the number of teeth $z_{r103}$ of the third ring gear 103 will be referred to as the third gear ratio $u_3$.

According to the fourth example, the number of teeth $z_{r101}$ of the first ring gear 101, the number of teeth $z_{r102}$ of the second ring gear 102, and the number of teeth $z_{r103}$ of the third ring gear 103 are 22, respectively. On the other hand, the number of teeth $z_{r105}$ of the first eccentric ring gear 105 is 17, the number of teeth $z_{r100}$ of the second eccentric ring gear 106 is 19, and the number of teeth $z_{r107}$ of the third eccentric ring gear 107 is 18. Accordingly, the first gear ratio $u_1$ may be expressed as:

$$u_1 = z_{r105}/z_{r101} \times 17/22 \approx 0.773;$$

the second gear ratio $u_2$ may be expressed as:

$$u_2 = z_{r106}/z_{r102} \times 19/22 \approx 0.864;\ \text{and}$$

the third gear ratio $u_3$ may be expressed as:

$$u_3 = z_{r107}/z_{r103} \times 18/22 \approx 0.818;$$

As described, the number of teeth $z_{r101}$ of the first ring gear 101, the number of teeth $z_{r102}$ of the second ring gear 102, and the number of teeth $z_{r103}$ of the third ring gear 103 are equal to one another. On the other hand, the number of teeth $z_{r105}$ of the first eccentric ring gear 105 is one less than the number of teeth $z_{r107}$ of the third eccentric ring gear 107, and the number of teeth $z_{r106}$ of the second eccentric ring gear 106 is one more than the number of teeth $z_{r107}$ of the third eccentric ring gear 107. For these reasons, the first gear ratio $u_1$, the second gear ratio $u_2$, and the third gear ratio $u_3$ are slightly different from one another.

As described, in the differential assembly D, the first complex planetary gear set is combined with the second complex planetary gear set to serve as the differential mechanism 3. According to the fourth example, the first complex planetary gear set comprises the first ring gear 101, the third ring gear 103, the first eccentric ring gear 105, and the third eccentric ring gear 107. On the other hand, the second complex planetary gear set comprises the second ring gear 102, the third ring gear 103, the second eccentric ring gear 106, and the third eccentric ring gear 107.

Thus, in the first complex planetary gear set, the first gear ratio $u_1$ and the third gear ratio $u_3$ are slightly different from each other. Given that the first gear ratio $u_1$ and the third gear ratio $u_3$ are equal to each other, the speed reducing ratio of the first complex planetary gear set as the speed ratio of the output element to the input element would reach an infinite value. Specifically, an inverse number of a ratio of a speed of the first ring gear 101 to a speed of the third ring gear 103 would reach an infinite value, and the first complex planetary gear set would not function properly. Whereas, since the first gear ratio $u_1$ and the third gear ratio $u_3$ are set to different values, the speed reducing ratio of the first complex planetary gear set can be increased without reaching the infinite value. For example, the speed reducing ratio of the first complex planetary gear set may be reduced by increasing the difference between the first gear ratio $u_1$ and the third gear ratio $u_3$. By contrast, the speed reducing ratio of the first complex planetary gear set may be increased by reducing the difference between the first gear ratio $u_1$ and the third gear ratio $u_3$.

Likewise, in the second complex planetary gear set, the second gear ratio $u_2$ and the third gear ratio $u_3$ are slightly different from each other. Given that the second gear ratio $u_2$ and the third gear ratio $u_3$ are equal to each other, the speed reducing ratio of the second complex planetary gear set as an inverse number of a ratio of a speed of the second ring gear 102 to a speed of the third ring gear 103 would reach an infinite value, and the second complex planetary gear set would not function properly. Whereas, since the second gear ratio $u_2$ and the third gear ratio $u_3$ are set to different values, the speed reducing ratio of the second complex planetary gear set can be increased without reaching the infinite value. For example, the speed reducing ratio of the second complex planetary gear set may be reduced by increasing the difference between the second gear ratio $u_2$ and the third gear ratio $u_3$. By contrast, the speed reducing ratio of the second complex planetary gear set may be increased by reducing the difference between the second gear ratio $u_2$ and the third gear ratio $u_3$.

As described, in the differential assembly D serving as the differential unit 11, the drive torque applied to the third ring gear 103 is distributed to the first rotary shaft 1 through the first ring gear 101 and the second rotary shaft 2 through the second ring gear 102. For example, given that the first rotary shaft 1 and the second rotary shaft 2 are rotated at a same speed, the first rotary shaft 1 and the second rotary shaft 2 are rotated integrally.

As also described, the number of teeth $z_{r105}$ of the first eccentric ring gear 105 is one less than the number of teeth $z_{r107}$ of the third eccentric ring gear 107. Therefore, given that the first rotary shaft 1 and the second rotary shaft 2 are rotated at the same speed, a rotational speed of the first ring gear 101 meshing with the first eccentric ring gear 105 is reduced slower than a rotational speed of the third ring gear 103 meshing with the third eccentric ring gear 107 due to the fact that the number of teeth $z_{r105}$ of the first eccentric ring gear 105 is one less than the number of teeth $z_{r107}$ of the third eccentric ring gear 107. On the other hand, the number of teeth $z_{r106}$ of the second eccentric ring gear 106 is one more than the number of teeth $z_{r107}$ of the third eccentric ring gear 107. In this situation, therefore, a rotational speed of the second ring gear 102 meshing with the second eccentric ring gear 106 is increased higher than a rotational speed of the third ring gear 103 meshing with the third eccentric ring gear 107 by the one more tooth of the second eccentric ring gear 106. Consequently, the first ring gear 101 and the second ring gear 102 are rotated in opposite directions. In this situation, the first eccentric ring gear 105, the second eccentric ring gear 106, and the third eccentric ring gear 107 rotate around the eccentric axis EL, and revolve along first ring gear 101, the second ring gear 102, and the third ring gear 103 around the rotational center axis AL. Therefore, torques are applied to an engagement site between the first ring gear 101 and the first eccentric ring gear 105, and to an engagement site between the second ring gear 102 and the second eccentric ring gear 106 in opposite directions thereby causing interference between those engagement sites. As a result, the differential assembly D is substantially brought into engagement to rotate integrally so that the first rotary shaft 1 and the second rotary shaft 2 are rotated integrally without rotating relatively to each other.

By contrast, given that the first rotary shaft 1 on which the first ring gear 101 is formed and the second rotary shaft 2 on which the second ring gear 102 is formed are rotated at different speeds, the differential assembly D will not be brought into engagement by such interference between the above-mentioned engagement sites. In this case, the drive torque is distributed from the third ring gear 103 to the first ring gear 101 and to the second ring gear 102 so that the first ring gear 101 and the second ring gear 102 are rotated relatively to each other. Consequently, torques are applied to the engagement site between the first ring gear 101 and the first eccentric ring gear 105 and to the engagement site between the second ring gear 102 and the second eccentric ring gear 106 in opposite directions, thereby rotating the first ring gear 101 and the second ring gear 102 in opposite directions. That is, the rotational direction of the second ring gear 102 is reversed to the opposite direction to the rotational direction of the first ring gear 101. As a result, the first rotary shaft 1 and the second rotary shaft 2 are rotated differentially in opposite directions.

Thus, the differential assembly D shown in FIG. 5 also comprises three sets of the internal contact type planetary gear sets. In the differential assembly D, the drive torque delivered from the prime mover is distributed to the first rotary shaft 1 and the second rotary shaft, and a speed difference between the first rotary shaft 1 and the second rotary shaft 2 is absorbed by the differential mechanism 3. For this reason, the differential assembly D may serve as a compact differential unit having a simple structure.

As illustrated in FIG. 6, the eccentric cam 108 is a cylindrical member having a hollow section 108b, and a thickness of a lower section of the eccentric cam 108 in FIG. 6 is increased thicker than the remaining section to serve as a counterbalance weight 110. According to the example shown in FIG. 6, the counterbalance weight 110 is formed integrally with the eccentric cam 108 while adjusting a weight to a desirable value. Instead, the counterbalance weight 110 may also be formed separately to be attached to an outer circumferential surface of the eccentric cam 108.

According to the fourth example, the external gears such as the first eccentric ring gear 105, the second eccentric ring gear 106, and the third eccentric ring gear 107 rotate (or revolve) eccentrically along the internal gears such as the first ring gear 101, the second ring gear 102, and the third ring gear 103. Consequently, the eccentric cam 108 rotates out-of-balance due to imbalance of weight of the unit of the external gears revolving around the rotational center axis AL. In order to correct such unbalance of rotation of the eccentric cam 108, the counterbalance weight 110 is formed on the eccentric cam 108. To this end, for example, the counterbalance weight 110 is formed on the eccentric cam 108 at a site 180 degrees out of phase with a radially outermost portion of the unit of the external gears on an orbit of the unit of the external gears. According to the fourth example, gear teeth are not formed on inner circumferential surfaces 105a, 106a, and 107a of the eccentric ring gears 105, 106, and 107. Therefore, an outer diameter of the unit of the first eccentric ring gear 105, the second eccentric ring gear 106, and the third eccentric ring gear 107 may be reduced so that a space for the counterbalance weight 110 may be ensured in the hollow section 108b of the eccentric cam 108. Thus, rotations of the rotary members in the differential mechanism 3 may be stabilized by the counterbalance weight 110.

The differential assembly D shown in FIG. 5 is also provided with an actuator (or a prime mover) to serve as a torque vectoring device that causes a differential rotation in the differential mechanism 3.

According to the fourth example, the control motor 27 is also adopted as the actuator to generate a control torque for controlling a differential rotation between the first rotary shaft 1 and the second rotary shaft 2. To this end, in the differential assembly D shown in FIG. 5, the control motor 27 is also arranged coaxially with the first rotary shaft 1 and the second rotary shaft 2. Specifically, the output shaft 27b of the control motor 27 is connected to the eccentric cam 108 of the differential mechanism 3 through an after-mentioned speed reducing planetary gear set 111.

As described, the drive torque applied to the third ring gear 103 is distributed to the first rotary shaft 1 through the first ring gear 101 and the second rotary shaft 2 through the second ring gear 102. Whereas, the control torque of the control motor 27 is delivered to the eccentric cam 108. The control torque delivered to the eccentric cam 108 is distributed to the first ring gear 101 and the second ring gear 102 while being multiplied, and further delivered to the first rotary shaft 1 and the second rotary shaft 2. Consequently, the first rotary shaft 1 and the second rotary shaft 2 are rotated in a differential manner in opposite directions.

According to the fourth example, a speed reducing ratio between the eccentric cam 108 and the first ring gear 101 is referred to as a first speed reducing ratio, and a speed reducing ratio between the eccentric cam 108 and the second ring gear 102 is referred to as a second speed reducing ratio. In the differential assembly D according to the fourth example, the first speed reducing ratio and the second speed reducing ratio are equal or approximated to each other. In other words, the first speed reducing ratio is an inverse number of a ratio of a rotational speed of the first ring gear 101 to a rotational speed of the eccentric cam 108, and the second speed reducing ratio is an inverse number of a ratio of a rotational speed of the second ring gear 102 to a rotational speed of the eccentric cam 108.

In the differential assembly D according to the fourth example, rotational speeds of both of the first ring gear 101 and the second ring gear 102 are reduced with respect to a rotational speed of the eccentric cam 108. That is, an absolute value of each of the first speed reducing ratio and the second speed reducing ratio is individually greater than 1. In the differential assembly D, therefore, the control torque applied to the eccentric cam 108 from the control motor 27 is delivered to the first ring gear 101 and the second ring gear 102 while being multiplied.

As described, in the differential assembly D shown in FIG. 5, the number of teeth $z_{r105}$ of the first eccentric ring gear 105 is 17, the number of teeth $z_{r106}$ of the second eccentric ring gear 106 is 19, the number of teeth $z_{r107}$ of the third eccentric ring gear 107 is 18, the number of teeth $z_{r101}$ of the first ring gear 101 is 22, the number of teeth $z_{r102}$ of the second ring gear 102 is 22, and the number of teeth $z_{r103}$ of the third ring gear 103 is 22. Accordingly, the first speed reducing ratio $R_1$ between the eccentric cam 108 and the first ring gear 101 may be expressed as:

$$R_1 = 1/\{1 - (z_{r105}/z_{r101}) \cdot (z_{r103}/z_{r107})\}$$

$$= 1/\{1 - (17/22) \cdot (22/18)\}$$

$$\approx 18.$$

In general, speed reducing ratios achieved by the conventional planetary gear sets falls within a range of approximately 4 to 10. Thus, the first speed reducing ratio $R_1$ is greater than the speed reducing ratios of the conventional planetary gear sets.

Likewise, the second speed reducing ratio $R_2$ between the eccentric cam 108 and the second ring gear 102 may be expressed as:

$$R_2 = 1/\{1 - (z_{r106}/z_{r102}) \cdot (z_{r103}/z_{r107})\}$$

$$= 1/\{1 - (19/22) \cdot (22/18)\}$$

$$\approx -18.$$

Thus, the second speed reducing ratio $R_2$ is also greater than the speed reducing ratios of the conventional planetary gear sets. As a result of applying the control torque to the eccentric cam 108, a rotational direction of the second ring gear 102 serving as an output element is reversed to the opposite direction to the rotational direction of the eccentric cam 108 serving as an input element. Therefore, the second speed reducing ratio $R_2$ is referred to as a negative value (e.g., −18) for the sake of convenience, and in the fourth example shown in FIG. 5, the speed reducing ratio R is indicated commonly as R=±18.

Thus, in the differential assembly D shown in FIG. 5, the first ring gear 101 and the second ring gear 102 are rotated differentially in opposite directions by rotating the eccentric cam 108 by the control torque. As described, the first speed reducing ratio $R_1$ as the ratio of a rotational speed of the first ring gear 101 to a rotational speed of the eccentric cam 108 and the second speed reducing ratio $R_2$ as the ratio of a rotational speed of the second ring gear 102 to a rotational speed of the eccentric cam 108 are equal or approximated to each other. In the differential assembly D shown in FIG. 5, therefore, the control torque generated by the control motor 27 is delivered to the first ring gear 101 and the second ring gear 102 while being multiplied by substantially same amplification factors.

In the differential assembly D shown in FIG. 5, the eccentric cam 108 as the input element is rotated in the forward direction when the control motor 27 is rotated in the forward direction (i.e., clockwise). In this situation, the first ring gear 101 as the output element is rotated in the forward direction, and the second ring gear 102 is rotated in the reverse direction (i.e., counterclockwise). According to the present disclosure, the second speed reducing ratio of the differential assembly D may be changed by changing the numbers of teeth of the gears 4, 5, and 6, and the eccentric gears 7, 8, and 9. In addition, the rotational directions of the first gear 4 and the second gear 5 as the output elements may be switched by changing the numbers of teeth of the gears 4, 5, and 6, and the eccentric gears 7, 8, and 9.

Thus, the differential assembly D according to the fourth example in which the control motor 27 is combined with the differential mechanism 3 may serve as a torque vectoring device. In the differential assembly D shown in FIG. 5, the control torque of the control motor 27 is distributed to the first rotary shaft 1 through the first ring gear 101 and to the second rotary shaft 2 through the second ring gear 102 while being multiplied. Consequently, the first ring gear 101 and the second ring gear 102 are rotated in opposite directions. That is, a distribution ratio of the drive torque to the first rotary shaft 1 connected to one of drive wheels and the second rotary shaft 2 connected to the other one of drive wheels can be controlled by changing the control torque generated by the control motor 27.

As described, the differential assembly D according to the fourth example comprises a complex planetary gear set formed by combining three sets of internal contact type planetary gear sets, and the speed reducing ratio between the eccentric cam 108 and each of the first ring gear 101 and the second ring gear 102 can be increased significantly. Specifically, an absolute value of each of the first speed reducing ratio $R_1$ and the second speed reducing ratio $R_2$ is 18, respectively. According to the fourth example, therefore, the control torque of the control motor 27 can be multiplied by a relatively large factor so that the control motor 27 can be downsized. For this reason, the differential assembly D may serve as a compact differential unit having a simple structure.

The differential assembly D according to the fourth example is also provided with the mechanism for preventing a passive rotation of the control motor 27.

Given that the first rotary shaft 1 and the second rotary shaft 2 rotate in the same direction at the same speed, the differential mechanism 3 is rotated integrally and passively. In this situation, if the control motor 72 is also rotated passively, a power transmitting efficiency of the differential assembly D may be reduced. In order to avoid such passive rotation of the control motor 72, the differential assembly D shown in FIG. 5 is provided with the speed reducing planetary gear set 111 and the speed increasing planetary gear set 112.

The speed reducing planetary gear set 111 is arranged between the control motor 27 and the eccentric cam 108 to multiply the control torque applied to the eccentric cam 108 from the control motor 27. Specifically, when the differential ring gear 17, the first rotary shaft 1, and the second rotary shaft 2 are rotated integrally, the speed reducing planetary gear set 111 reduces a rotational speed of the eccentric cam 108 slower than a rotational speed of the output shaft 27b of the control motor 27.

Specifically, the speed reducing planetary gear set 111 is a single-pinion planetary gear set formed coaxially with the first rotary shaft 1 and the second rotary shaft 2. The speed reducing planetary gear set 111 comprises a reduction sun gear 111a, a reduction ring gear 111b, a reduction carrier 111c, and a planetary gear 111d.

The reduction sun gear 111a is formed around one end of the output shaft 27b of the control motor 27 supported by the case 12 in a rotatable manner so that the reduction sun gear 111a is rotated integrally with the output shaft 27b.

The reduction ring gear 111b as an internal gear is meshed with the planetary gear 111d while being supported by the case 12 in a rotatable manner. Specifically, the reduction ring gear 111b is connected to an after-mentioned speed increasing ring gear 112b of the speed increasing planetary gear set 112 to be rotated integrally with the speed increasing ring gear 112b.

The reduction carrier 111c supports the planetary gear 111d in a rotatable manner. Specifically, the reduction carrier 111c is joined to the eccentric cam 108 of the differential assembly D so that the reduction carrier 111c is rotated integrally with the eccentric cam 108. As explained later, when the differential ring gear 17, the first rotary shaft 1, and the second rotary shaft 2 rotate integrally, a rotational speed of the reduction carrier 111c is reduced lower than a rotational speed of the reduction ring gear 111b.

Specifically, when the reduction sun gear 111a is rotated by the control torque delivered from the output shaft 27b, the reduction ring gear 111b serves as a reaction element of the speed reducing planetary gear set 111 so that a rotational speed of the reduction carrier 111c is reduced lower than a rotational speed of the reduction sun gear 111a. That is, the speed reducing planetary gear set 111 serves as a speed reducing mechanism of the control motor 27 so that the control torque of the control motor 27 is delivered to the eccentric cam 108 while being multiplied by the speed reducing planetary gear set 111.

As indicated in FIG. 5, the number of teeth of the reduction sun gear 111a is 36, the number of teeth of the reduction ring gear 111b is 72, and the number of teeth of the planetary gear 111d is 18. Accordingly, a speed reducing ratio of the speed reducing planetary gear set 111 is 3. Therefore, based on the fact that the speed reducing ratio R of the differential assembly D shown in FIG. 5 (i.e., the first speed reducing ratio $R_1$ and the second speed reducing ratio $R_2$) is ±18, an actual speed reducing ratio R' of the differential assembly D shown in FIG. 5 taking into account the speed reducing ratio of the speed reducing planetary gear set 111 is:

$$R'=\pm 18 \cdot 3=\pm 54.$$

Thus, the speed reducing ratio of the differential assembly D shown in FIG. 5 is multiplied by the speed reducing planetary gear set 111.

The speed increasing planetary gear set 112 is also a single-pinion planetary gear set arranged coaxially with the first rotary shaft 1 and the second rotary shaft 2. The speed increasing planetary gear set 112 comprises a speed increasing sun gear 112a, the speed increasing ring gear 112b, a speed increasing carrier 112c, and a planetary gear 112d.

The speed increasing sun gear 112a may be formed around a hollow shaft that is not allowed to rotate. For example, the speed increasing sun gear 112a is fitted onto a flange (not shown) formed integrally with the case 12. That is, the speed increasing sun gear 112a is not allowed to rotate.

The speed increasing ring gear 112b as an internal gear is meshed with the planetary gear 112d while being supported by the case 12 in a rotatable manner together with the reduction ring gear 111b. As described, the speed increasing ring gear 112b is connected to the reduction ring gear 111b so that the speed increasing ring gear 112b is rotated integrally with the reduction ring gear 111b. When the speed increasing carrier 112c is rotated, a rotational speed of the speed increasing ring gear 112b is increased higher than a rotational speed of the speed increasing carrier 112c.

The speed increasing carrier 112c supports the planetary gear 112d in a rotatable manner. Specifically, the speed increasing carrier 112c is connected to the differential ring gear 17 through the rotary shaft 104 of the third ring gear 103 so that the speed increasing carrier 112c is rotated integrally with the third ring gear 103 and the differential ring gear 17.

Specifically, when the speed increasing carrier 112c is rotated by the torque delivered from the differential ring gear 17, the speed increasing sun gear 112a serves as a reaction element of the speed increasing planetary gear set 112 so that a rotational speed of the speed increasing ring gear 112b is increased higher than a rotational speed of the speed increasing carrier 112c. Thus, the speed increasing planetary gear set 112 serves as a speed increasing mechanism.

As indicated in FIG. 5, the number of teeth of the speed increasing sun gear 112a is 36, the number of teeth of the speed increasing ring gear 112b is 72, and the number of teeth of the planetary gear 112d is 18. Thus, the number of teeth of the speed increasing sun gear 112a is equal to that of the reduction sun gear 111a, the number of teeth of the speed increasing ring gear 112b is equal to that of the reduction ring gear 111b, and the number of teeth of the planetary gear 112d is equal to that of the planetary gear 111d. Accordingly, a gear ratio (or speed ratio) of the speed increasing planetary gear set 112 is equal to that of the speed reducing planetary gear set 111.

As described, when the first rotary shaft 1 and the second rotary shaft 2 rotate in the same direction at the same speed, the differential assembly D shown in FIG. 5 is rotated integrally and passively. Consequently, the speed increasing carrier 112c of the speed increasing planetary gear set 112 and the reduction carrier 111c of the speed reducing planetary gear set 111 are rotated in the same direction at the same speed. In this situation, the speed increasing planetary gear set 112 in which the speed increasing sun gear 112a is fixed serves as a speed increasing mechanism to increase a rotational speed of the speed increasing ring gear 112b higher than a rotational speed of the speed increasing carrier 112c. On the other hand, the speed reducing planetary gear set 111 serves as a speed reducing mechanism to reduce a rotational speed of the reduction carrier 111c lower than a rotational speed of the reduction ring gear 111b. As described, since the speed increasing carrier 112c and the reduction carrier 111c are rotated at the same speed, and the reduction ring gear 111b and the speed increasing ring gear 112b are connected to each other, the reduction ring gear 111b and the speed increasing ring gear 112b are also rotated at the same speed. Consequently, an absolute value of the speed increasing ratio of the speed increasing planetary gear set 112 and an absolute value of the speed reducing ratio of the speed reducing planetary gear set 111 are equalized to each other. In this situation, since a rotational speed of the speed increasing sun gear 112a is zero, the rotational speed of the reduction sun gear 111a is reduced to substantially zero that is lower than the rotational speed of the reduction ring gear 111b, in accordance with the gear ratio of the speed reducing planetary gear set 111. That is, since the gear ratio of the speed increasing planetary gear set 112 and the gear ratio of the speed reducing planetary gear set 111 are equal to each other, the rotational speed of the reduction sun gear 111a is reduced to substantially zero. Consequently, when the first rotary shaft 1 and the second rotary shaft 2 rotate in the same direction at the same speed so that the differential assembly D shown in FIG. 5 is rotated integrally and passively, a rotational speed of the output shaft 27b of the control motor 27 connected to the reduction sun gear 111a is maintained to zero. That is, a passive rotation of the control motor 27 is prevented.

By thus preventing the passive rotation of the control motor 27, a power transmission efficiency of the differential unit 11 and an energy efficiency of the vehicle can be improved. In addition, since the control motor 27 will not be rotated passively, the differential unit 11 will not be subjected to an inertia torque of the control motor 27 even if the vehicle is accelerated or decelerated abruptly while travelling in a straight line. For this reason, it is not necessary to execute an additional control to generate a cancel torque against the inertia torque of the control motor 27. That is, a torque vectoring control of the differential unit 11 using the control motor 27 can be simplified.

Figure 7:
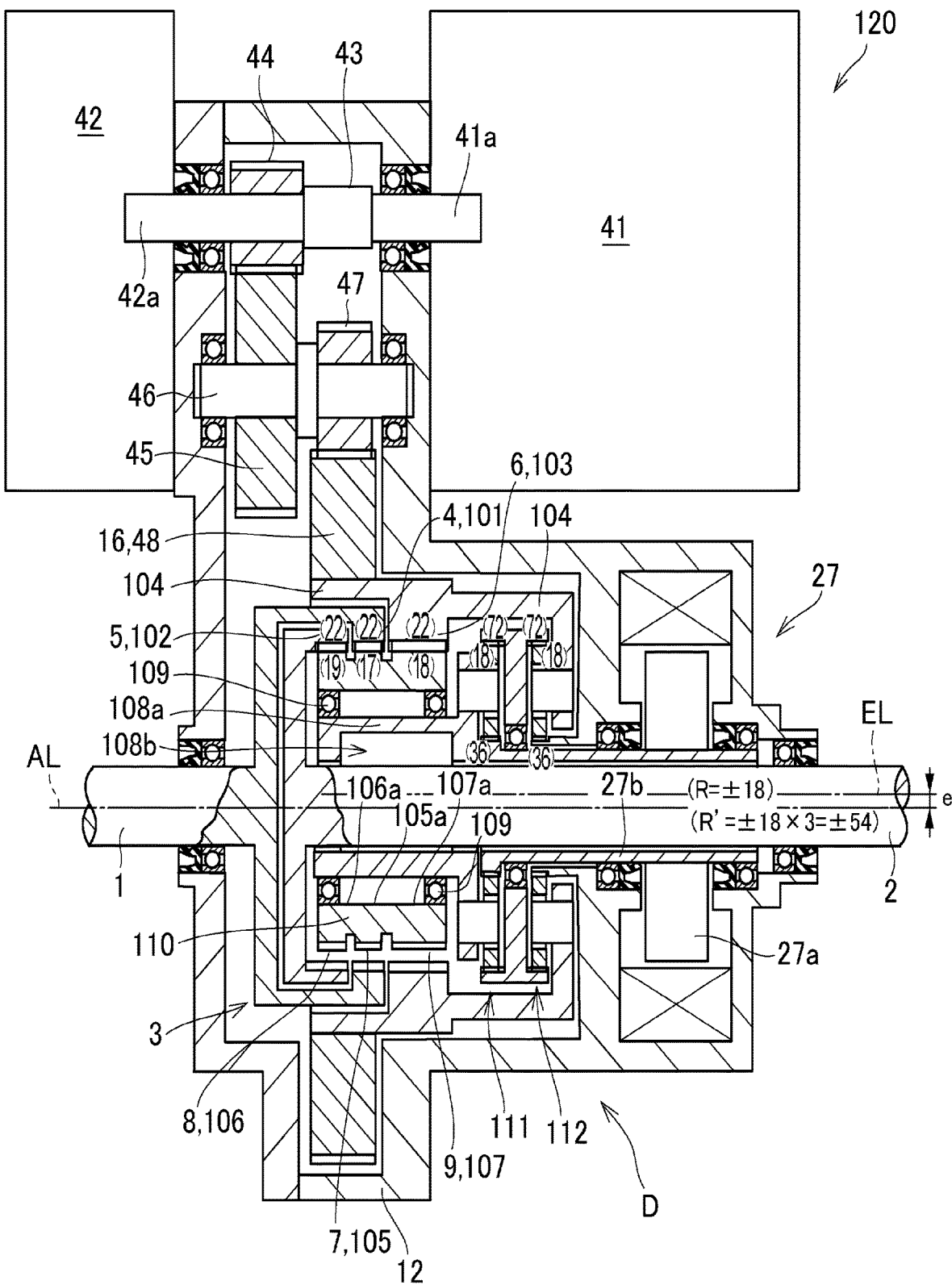
FIG. 7 is a cross-sectional view showing a structure of the differential assembly according a fifth example of the present disclosure.
Figure 8:
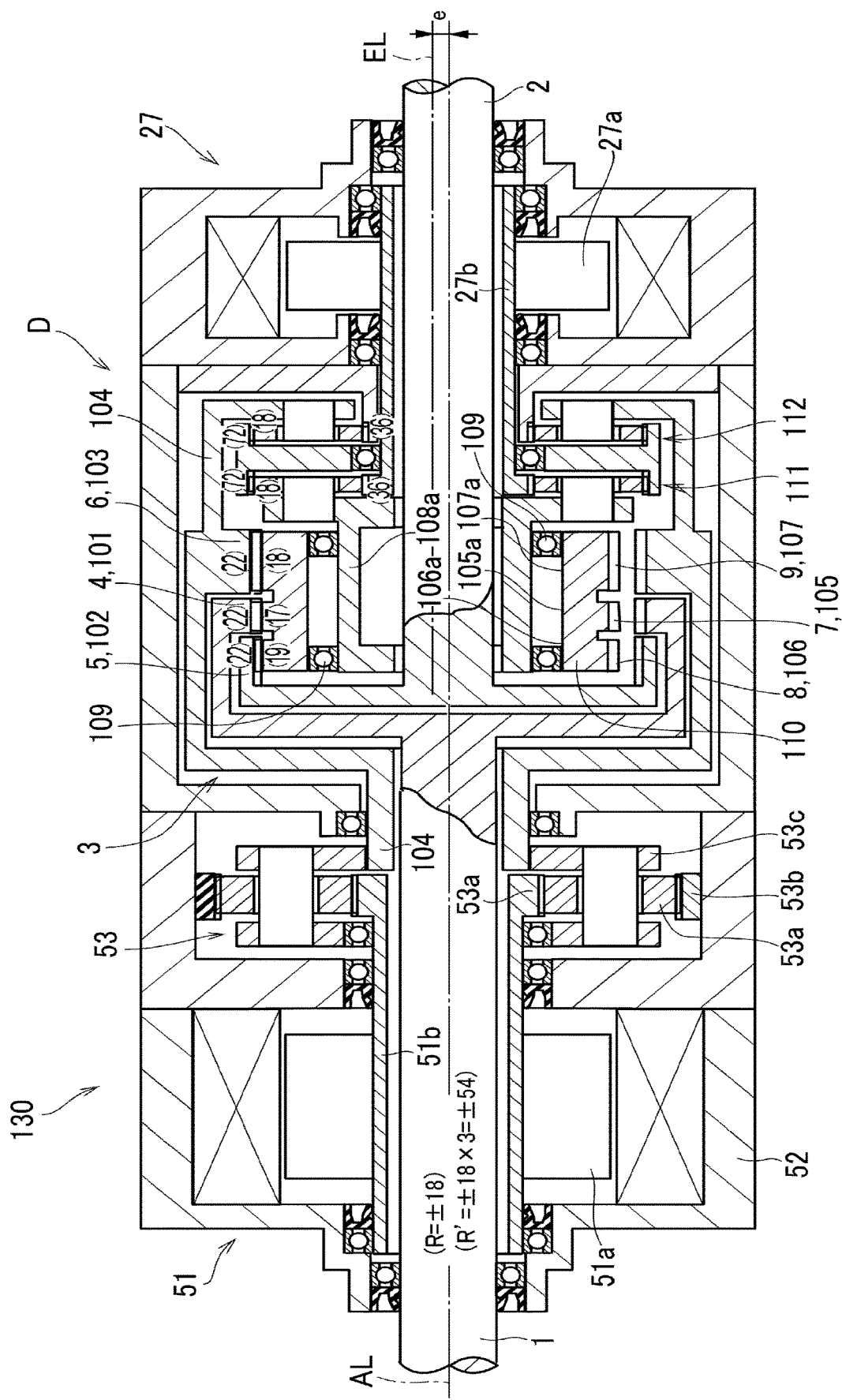
FIG. 8 is a cross-sectional view showing a structure of the differential assembly according a sixth example of the present disclosure.

Modifications of the differential assembly D shown in FIG. 5 are shown in FIGS. 7 and 8. In FIGS. 7 and 8, common reference numerals are assigned to the elements in common with those of the differential assembly D shown in FIG. 5.

Turing to FIG. 7, there is shown a fifth example as a modification example of the differential assembly D shown in FIG. 5. According to the fifth example, as the fourth example, the differential unit 11 is also combined with the prime mover to serve as a power unit 120 having a torque vectoring function.

The prime mover of the power unit 120 also includes the drive motor 41 and the brake device 42. As described, the drive motor 41 generates a drive torque to accelerate the vehicle and a regenerative torque to decelerate the vehicle, and the brake device 42 generates a regenerative torque to apply a brake force to the vehicle. Thus, the differential assembly D shown in FIG. 7 is combined with the drive motor assembly having a braking function.

In the differential assembly D shown in FIG. 7, the input gear 48 is connected to the rotary shaft 104 of the third ring gear 103 to be rotated integrally with the third ring gear 103. In the differential assembly D shown in FIG. 7, therefore, the torques generated by the drive motor 41 and the brake device 42 are delivered to the third ring gear 103 while being amplified.

Thus, according to the fifth example, the differential assembly D shown in FIG. 7 is combined with the drive motor 41 and the brake device 42 to serve as the power unit 120 having the torque vectoring function. Here, it is to be noted that any one of the drive motor 41 and the brake device 42 may be omitted. In this case, the power unit 40 serves as a motor drive unit or a brake unit having a torque vectoring function.

Turning to FIG. 8, there is shown a sixth example also as a modification example of the differential assembly D shown in FIG. 5. According to the sixth example, the differential assembly D shown in FIG. 8 is adapted to serve a center differential mechanism 130 that is to be mounted on a four-wheel drive layout vehicle. In the center differential mechanism 130, the first rotary shaft 1 and the second rotary shaft 2 extend coaxially with each other along a longitudinal direction of the vehicle.

The center differential mechanism 130 comprises the drive motor 51 as a prime mover. The rotor shaft 51b of the drive motor 51 is connected to the third ring gear 103 through the reduction gear set 53.

Therefore, an output torque of the drive motor 51 is delivered to the third ring gear 15 while being multiplied by the reduction gear set 53. As described, the reduction gear set 53 as a single-pinion planetary gear set comprises the sun gear 53a, the ring gear 53b, the carrier 53c, and the planetary gear 53d.

When the torque of the drive motor 51 is delivered to the sun gear 53a, the ring gear 53b serves as a reaction element of the reduction gear set 53 so that a rotational speed of the carrier 53c connected to the third ring gear 103 is reduced slower than a rotational speed of the sun gear 53a. That is, the torque of the drive motor 51 is delivered to the third ring gear 103 while being multiplied by the reduction gear set 53.

Thus, according to the sixth example, the differential assembly D shown in FIG. 8 may be arranged coaxially with the drive motor 51 to serve as the center differential mechanism 130. As described, the center differential mechanism 130 may be mounted on a four-wheel drive layout vehicle to serve as a compact power unit having a torque vectoring function.

In the foregoing examples, the case is maintained in a liquid-tight condition by sealing members illustrated in the drawings, and rotary members are supported rotatably by bearings illustrated in the drawings.

Figure 9:
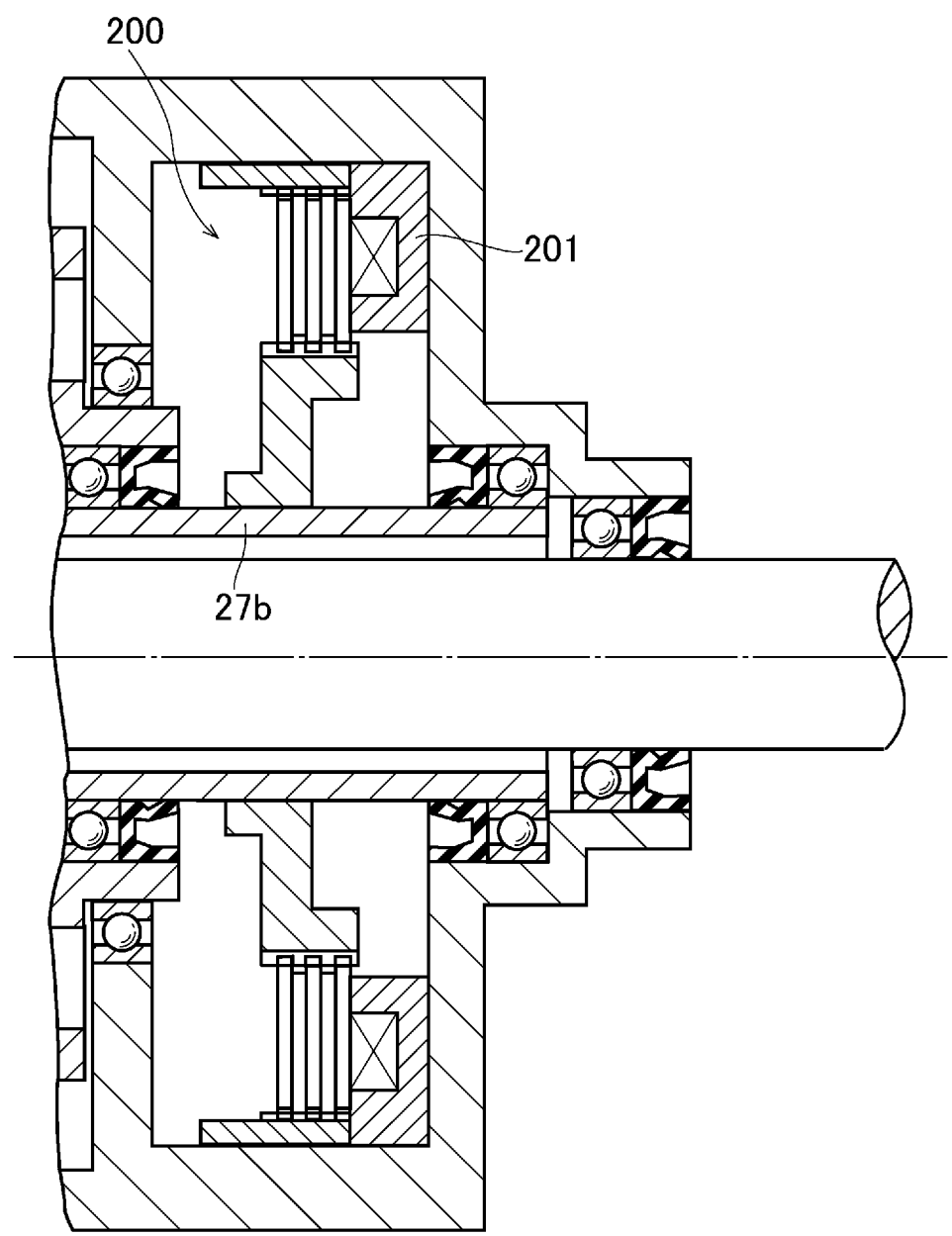
FIG. 9 is a cross-sectional view showing a structure of an electromagnetic brake serving as the control motor.
Figure 10:
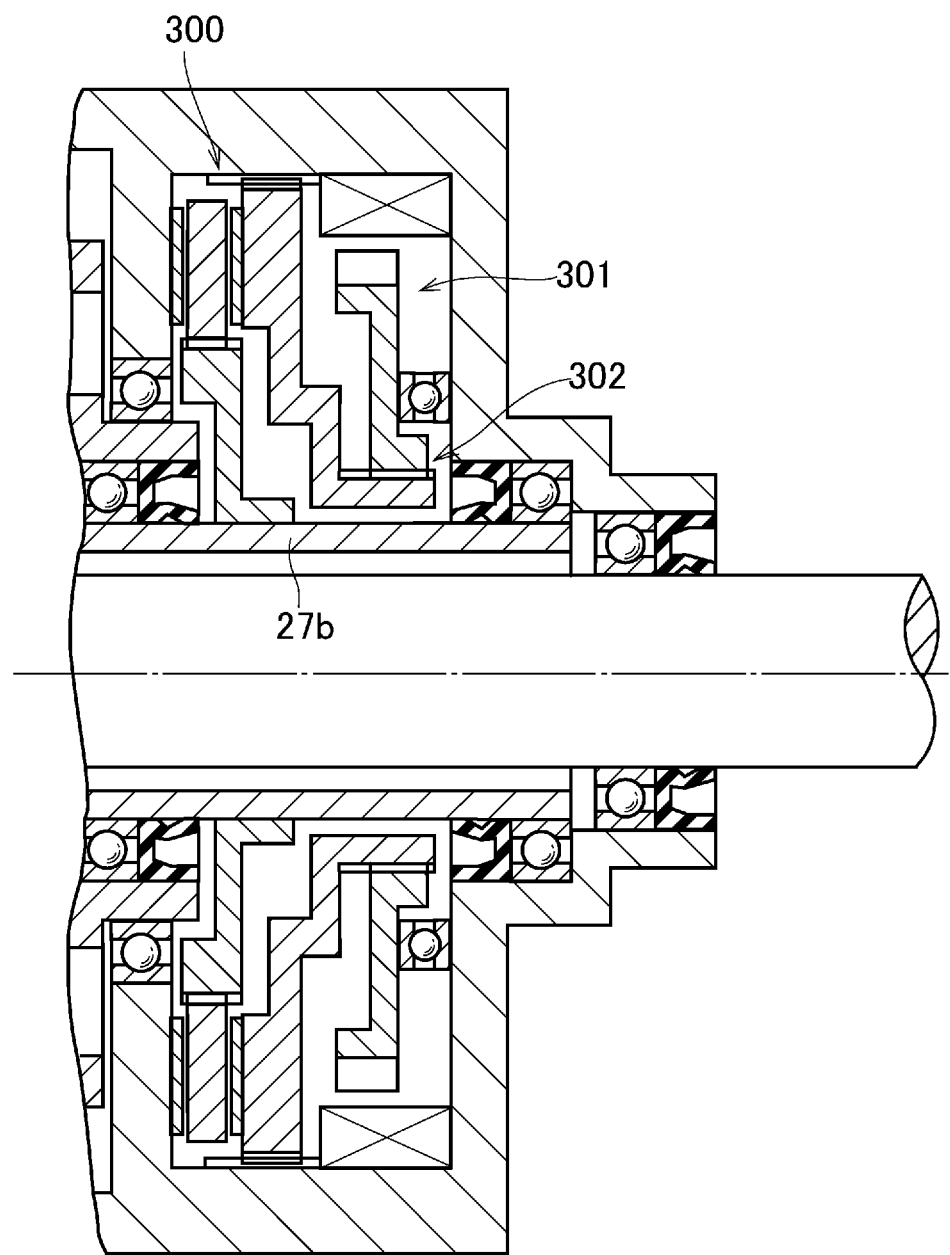
FIG. 10 is a cross-sectional view showing a structure of an electric brake serving as the control motor.

Although the above exemplary embodiment of the present disclosure has been described, it will be understood by those skilled in the art that the present disclosure should not be limited to the described exemplary embodiments, and various changes and modifications can be made within the scope of the present disclosure. As described, a brake device may also be adopted as the control motor 27 to generate a torque for controlling a rotation of the input element of the differential assembly D such as the eccentric carrier 24 and the eccentric cam 108. For example, an electromagnetic brake 200 shown in FIG. 9 may also be employed instead of the control motor 27. Specifically, the electromagnetic brake 200 is adapted to apply a braking force derived from a magnetic attraction established by energizing a coil 201 to the input element of the differential assembly D. In addition, an electric brake 300 shown in FIG. 10 may also be employed instead of the control motor 27. Specifically, the electric brake 300 is adapted to generate a frictional braking force by actuating a feed-screw mechanism 302 by a motor 301.

What is claimed is:

1. A differential assembly, comprising:
   an input member to which a drive torque is delivered from a prime mover;
   a first rotary shaft and a second rotary shaft extending coaxially while being allowed to rotate relatively to each other; and
   a differential mechanism that distributes the drive torque delivered to the input member to the first rotary shaft and the second rotary shaft, and that allows the first rotary shaft and the second rotary shaft to rotate at different speeds,
   wherein the differential mechanism comprises:
      a first gear that is arranged around a common rotational axis of the first rotary shaft and the second rotary shaft to be rotated integrally with the first rotary shaft;
      a second gear that is arranged around the common rotational axis to be rotated integrally with the second rotary shaft and to be rotated relatively to the first gear;
      a third gear to which the drive torque is delivered from the input member, and that is arranged around the common rotational axis while being allowed to rotate relatively to the first gear and the second gear;
      a first eccentric gear that is arranged around an eccentric axis offset from the common rotational axis to be meshed with the first gear;
      a second eccentric gear that is arranged around the eccentric axis to be meshed with the second gear and to be rotated integrally with the first eccentric gear;
      a third eccentric gear that is arranged around the eccentric axis to be meshed with the third gear and to be rotated integrally with the first eccentric gear and the second eccentric gear; and
      an eccentric member that is arranged around the common rotational axis to support the first eccentric gear, the second eccentric gear, and the third eccentric gear, such that the first eccentric gear, the second eccentric gear, and the third eccentric gear rotate around the eccentric axis and revolve around the common rotational axis,
   internal gears are employed as: one of a set of the first gear, the second gear, and the third gear; and a set of the first eccentric gear, the second eccentric gear, and the third eccentric gear,
   external gears are employed as: the other one of the set of the first gear, the second gear, and the third gear; and the set of the first eccentric gear, the second eccentric gear, and the third eccentric gear,
   the external gears engage with the internal gears from radially inner side, respectively,
   a gear ratio between the first gear and the first eccentric gear, a gear ratio between the second gear and the second eccentric gear, and a gear ratio between the third gear and the third eccentric gear are set to different values,
   a rotational speed of the first gear and a rotational speed of the second gear are reduced slower than a rotational speed of the eccentric member,
   a control motor that generates a control torque to be applied to the third gear,
   wherein the differential mechanism allows the first gear and the second gear to rotate in opposite directions when the control torque is applied to the third gear from the control motor, and
   a distribution ratio of the drive torque delivered from the input member to the first rotary shaft and the second rotary shaft is controlled by changing the control torque generated by the control motor.

2. The differential assembly as claimed in claim 1, further comprising:
   a speed increasing planetary gear set comprising a speed increasing sun gear, a speed increasing ring gear, and a speed increasing carrier; and
   a speed reducing planetary gear set comprising a reduction sun gear, a reduction ring gear, and a reduction carrier,
   wherein the speed increasing planetary gear set and the speed reducing planetary gear set are formed around the common rotational axis,
   the speed increasing sun gear is fixed and not allowed to rotate,
   the speed increasing carrier is rotated integrally with the first gear,
   the speed increasing ring gear is rotated at a higher speed than a rotational speed of the speed increasing carrier,
   the reduction ring gear is connected to the speed increasing ring gear to be rotated integrally with the speed increasing ring gear,
   the reduction carrier is rotated integrally with the eccentric member at a lower speed than a rotational speed of the reduction ring gear, and
   the reduction sun gear is rotated integrally with an output shaft of the control motor, and relatively to the first gear and the eccentric member, when the first rotary shaft and the second rotary shaft are rotated passively at a same speed in a same direction together with the eccentric member.

3. The differential assembly as claimed in claim 1,
   wherein the differential assembly is mounted on a vehicle having a right wheel and a left wheel together with the prime mover and the control motor,
   the first rotary shaft transmits a torque between one of the wheels and the first gear,
   the second rotary shaft transmits a torque between the other one of the wheels and the second gear, and
   the first rotary shaft and the second rotary shaft extend coaxially in a width direction of the vehicle.

4. The differential assembly as claimed in claim 1,
   wherein the differential assembly is mounted on a vehicle having a front wheel and a rear wheel together with the prime mover and the control motor,
   the first rotary shaft transmits a torque between one of the wheels and the first gear,
   the second rotary shaft transmits a torque between the other one of the wheels and the second gear, and
   the first rotary shaft and the second rotary shaft extend coaxially in a longitudinal direction of the vehicle.

5. The differential assembly as claimed in claim 1,
wherein the first gear includes a first ring gear as the internal gear,
the second gear includes a second ring gear as the internal gear,
the third gear includes a third ring gear as the internal gear,
the first eccentric gear includes a first eccentric ring gear as the external gear,
the second eccentric gear includes a second eccentric ring gear as the external gear,
the third eccentric gear includes a third eccentric ring gear as the external gear,
the eccentric member includes an eccentric cam that supports the first eccentric ring gear, the second eccentric ring gear, and the third eccentric ring gear in a rotatable manner from radially inner side, and
the eccentric cam allows the first eccentric ring gear, the second eccentric ring gear, and the third eccentric ring gear to rotate around the eccentric axis and revolve around the common rotational axis, when the eccentric cam rotates.

6. The differential assembly as claimed in claim 5,
wherein the eccentric cam is formed into a cylindrical shape around the eccentric axis, and
the eccentric cam comprises a counterbalance weight that is formed on an inner circumferential surface of the eccentric cam to correct an unbalance of rotation of the eccentric cam.

7. A differential assembly, comprising:
an input member to which a drive torque is delivered from a prime mover;
a first rotary shaft and a second rotary shaft extending coaxially while being allowed to rotate relatively to each other; and
a differential mechanism that distributes the drive torque delivered to the input member to the first rotary shaft and the second rotary shaft, and that allows the first rotary shaft and the second rotary shaft to rotate at different speeds,
wherein the differential mechanism comprises:
  a first gear that is arranged around a common rotational axis of the first rotary shaft and the second rotary shaft to be rotated integrally with the first rotary shaft;
  a second gear that is arranged around the common rotational axis to be rotated integrally with the second rotary shaft and to be rotated relatively to the first gear;
  a third gear to which the drive torque is delivered from the input member, and that is arranged around the common rotational axis while being allowed to rotate relatively to the first gear and the second gear;
  a first eccentric gear that is arranged around an eccentric axis offset from the common rotational axis to be meshed with the first gear;
  a second eccentric gear that is arranged around the eccentric axis to be meshed with the second gear and to be rotated integrally with the first eccentric gear;
  a third eccentric gear that is arranged around the eccentric axis to be meshed with the third gear and to be rotated integrally with the first eccentric gear and the second eccentric gear; and
  an eccentric member that is arranged around the common rotational axis to support the first eccentric gear, the second eccentric gear, and the third eccentric gear, such that the first eccentric gear, the second eccentric gear, and the third eccentric gear rotate around the eccentric axis and revolve around the common rotational axis,
internal gears are employed as: one of a set of the first gear, the second gear, and the third gear; and a set of the first eccentric gear, the second eccentric gear, and the third eccentric gear,
external gears are employed as: the other one of the set of the first gear, the second gear, and the third gear; and the set of the first eccentric gear, the second eccentric gear, and the third eccentric gear,
the external gears engage with the internal gears from radially inner side, respectively,
a gear ratio between the first gear and the first eccentric gear, a gear ratio between the second gear and the second eccentric gear, and a gear ratio between the third gear and the third eccentric gear are set to different values, and
a rotational speed of the first gear and a rotational speed of the second gear are reduced slower than a rotational speed of the eccentric member, wherein
  the first gear includes a first sun gear as the external gear,
  the second gear includes a second sun gear as the external gear,
  the third gear includes a third sun gear as the external gear,
  the first eccentric gear includes a first eccentric ring gear as the internal gear,
  the second eccentric gear includes a second eccentric ring gear as the internal gear,
  the third eccentric gear includes a third eccentric ring gear as the internal gear,
  the eccentric member includes an eccentric carrier that supports the first eccentric ring gear, the second eccentric ring gear, and the third eccentric ring gear in a rotatable manner from radially outer side, and
  the eccentric carrier allows the first eccentric ring gear, the second eccentric ring gear, and the third eccentric ring gear to rotate around the eccentric axis and revolve around the common rotational axis, when the eccentric carrier rotates.

8. The differential assembly as claimed in claim 7,
wherein the eccentric carrier is formed into a cylindrical shape around the common rotational axis, and
the eccentric carrier comprises a counterbalance weight that is formed on an outer circumferential surface of the eccentric carrier to correct an unbalance of rotation of the eccentric carrier.

* * * * *